US008675073B2

(12) United States Patent
Aagaard et al.

(10) Patent No.: US 8,675,073 B2
(45) Date of Patent: Mar. 18, 2014

(54) VIDEO SYSTEM AND METHODS FOR OPERATING A VIDEO SYSTEM

(76) Inventors: Kenneth Joseph Aagaard, Guttenberg, NJ (US); Larry Barbatsoulis, Long Beach, NY (US); Frank Trizano, Scarsdale, NY (US); Craig Matthew Farrell, Little Rock, AR (US)

(*) Notice: Subject to any disclaimer, the term of this patent is extended or adjusted under 35 U.S.C. 154(b) by 0 days.

(21) Appl. No.: 13/042,040

(22) Filed: Mar. 7, 2011

(65) Prior Publication Data

US 2011/0211096 A1  Sep. 1, 2011

Related U.S. Application Data

(62) Division of application No. 10/008,077, filed on Nov. 8, 2001, now abandoned.

(51) Int. Cl.
*H04N 7/18* (2006.01)
*H04N 5/232* (2006.01)

(52) U.S. Cl.
USPC .................. 348/157; 348/159; 348/211.11

(58) Field of Classification Search
USPC ............ 348/143, 159, 211.99, 211.11, 211.2, 348/211.3, 211.1, 157
See application file for complete search history.

(56) References Cited

U.S. PATENT DOCUMENTS

| 3,217,098 A | 11/1965 | Oswald |
| 3,969,588 A | 7/1976 | Raydon et al. |
| 4,684,990 A | 8/1987 | Oxley |
| 4,741,038 A | 4/1988 | Elko et al. |
| 4,905,081 A | 2/1990 | Morton |

(Continued)

FOREIGN PATENT DOCUMENTS

| EP | 0 529 317 A1 | 3/1993 |
| EP | 0 714 081 A1 | 5/1996 |

(Continued)

OTHER PUBLICATIONS

Peter Rander, "A Multi-Camera Method for 3D Digitization of Dynamic, Real-World Events", May 1998, Submitted in partial fulfillment of the requirements for the degree of Doctor of Philoophy in electrical and Computer Engineering, CMU-RI-TR-98-12, 135pgs.

(Continued)

*Primary Examiner* — Timothy J Henn
(74) *Attorney, Agent, or Firm* — Buckley, Maschoff & Talwalkar LLC

(57) ABSTRACT

A multiple camera video system and methods for operating such a system. The system may include a plurality of cameras located around a stadium, athletic playing field or other location. The cameras are remotely controlled in a master-slave configuration. A camera operator at a master pan head selects one of the plurality of cameras as the current master camera and utilizes the master pan head to adjust the telemetry and zoom of the master camera to follow the target object. The telemetry and zoom parameters of the master camera are then used to calculate corresponding telemetry, zoom and/or other parameters for each of the plurality of slave cameras. Video captured by each of the cameras is stored for the production of replay video feeds or for archiving. The replays may be capable of "spinning" through the video feeds of adjacent cameras in order for the viewer to get the sensation of revolving around the target object. The multiple camera video system also includes methods for calibrating the system.

7 Claims, 20 Drawing Sheets

(56) References Cited

U.S. PATENT DOCUMENTS

| | | | | |
|---|---|---|---|---|
| 5,101,268 | A | 3/1992 | Ohba | |
| 5,164,827 | A | 11/1992 | Paff | |
| 5,363,297 | A | 11/1994 | Larson et al. | |
| 5,434,617 | A | 7/1995 | Bianchi | |
| 5,448,291 | A | 9/1995 | Wickline | |
| 5,495,576 | A | 2/1996 | Ritchey | |
| 5,570,177 | A * | 10/1996 | Parker et al. | 356/139.06 |
| 5,590,094 | A | 12/1996 | Inanaga et al. | |
| 5,598,208 | A | 1/1997 | McClintock | |
| 5,617,490 | A | 4/1997 | Kume et al. | |
| 5,668,595 | A | 9/1997 | Katayama et al. | |
| 5,675,377 | A | 10/1997 | Gibas | |
| 5,684,937 | A | 11/1997 | Oxaal | |
| 5,699,444 | A | 12/1997 | Palm | |
| 5,714,997 | A | 2/1998 | Anderson | |
| 5,729,471 | A | 3/1998 | Jain et al. | |
| 5,745,126 | A | 4/1998 | Jain et al. | |
| 5,831,619 | A | 11/1998 | Nakagawa et al. | |
| 5,850,352 | A | 12/1998 | Moezzi et al. | |
| 5,892,538 | A | 4/1999 | Gibas | |
| 5,912,700 | A | 6/1999 | Honey et al. | |
| 5,963,203 | A | 10/1999 | Goldberg et al. | |
| 6,002,743 | A | 12/1999 | Telymonde | |
| 6,009,188 | A | 12/1999 | Cohen et al. | |
| 6,014,163 | A | 1/2000 | Houskeeper | |
| 6,038,368 | A | 3/2000 | Boetje et al. | |
| 6,057,833 | A | 5/2000 | Heidmann et al. | |
| 6,069,961 | A | 5/2000 | Nakazawa | |
| 6,072,571 | A | 6/2000 | Houlberg | |
| 6,128,006 | A | 10/2000 | Rosenberg et al. | |
| 6,133,946 | A | 10/2000 | Cavallaro et al. | |
| 6,160,544 | A | 12/2000 | Hayashi et al. | |
| 6,204,813 | B1 | 3/2001 | Wadell et al. | |
| 6,275,258 | B1 | 8/2001 | Chim | |
| 6,359,647 | B1 | 3/2002 | Sengupta et al. | |
| 6,507,366 | B1 | 1/2003 | Lee | |
| 6,900,842 | B2 * | 5/2005 | Saito et al. | 348/348 |
| 6,919,921 | B1 | 7/2005 | Morota et al. | |
| 7,005,970 | B2 | 2/2006 | Hodsdon et al. | |
| 7,027,083 | B2 * | 4/2006 | Kanade et al. | 348/159 |
| 7,046,812 | B1 | 5/2006 | Kochanski et al. | |
| 7,187,857 | B2 * | 3/2007 | Okawara | 396/79 |
| 7,193,645 | B1 | 3/2007 | Aagaard et al. | |
| 2002/0005902 | A1 | 1/2002 | Yuen | |
| 2002/0090217 | A1 | 7/2002 | Limor et al. | |
| 2002/0118286 | A1 | 8/2002 | Kanade et al. | |
| 2003/0210329 | A1 | 11/2003 | Aagaard et al. | |
| 2005/0159252 | A1 | 7/2005 | Fergestad et al. | |

FOREIGN PATENT DOCUMENTS

| | | |
|---|---|---|
| WO | 98/47291 A2 | 10/1998 |
| WO | 00/08856 A1 | 2/2000 |
| WO | 01/08417 A1 | 2/2001 |
| WO | 01/10517 A1 | 2/2001 |

OTHER PUBLICATIONS

Rudy Martzke, "Instant replay gets 'Matrix'-like view of key plays", Jan. 24, 2001, USA Today, retrieved Mar. 7, 2011, downloaded from http://www.usatoday.com/sports/nfl/super/0221-01-23-matrix.htm, 4pgs.

* cited by examiner

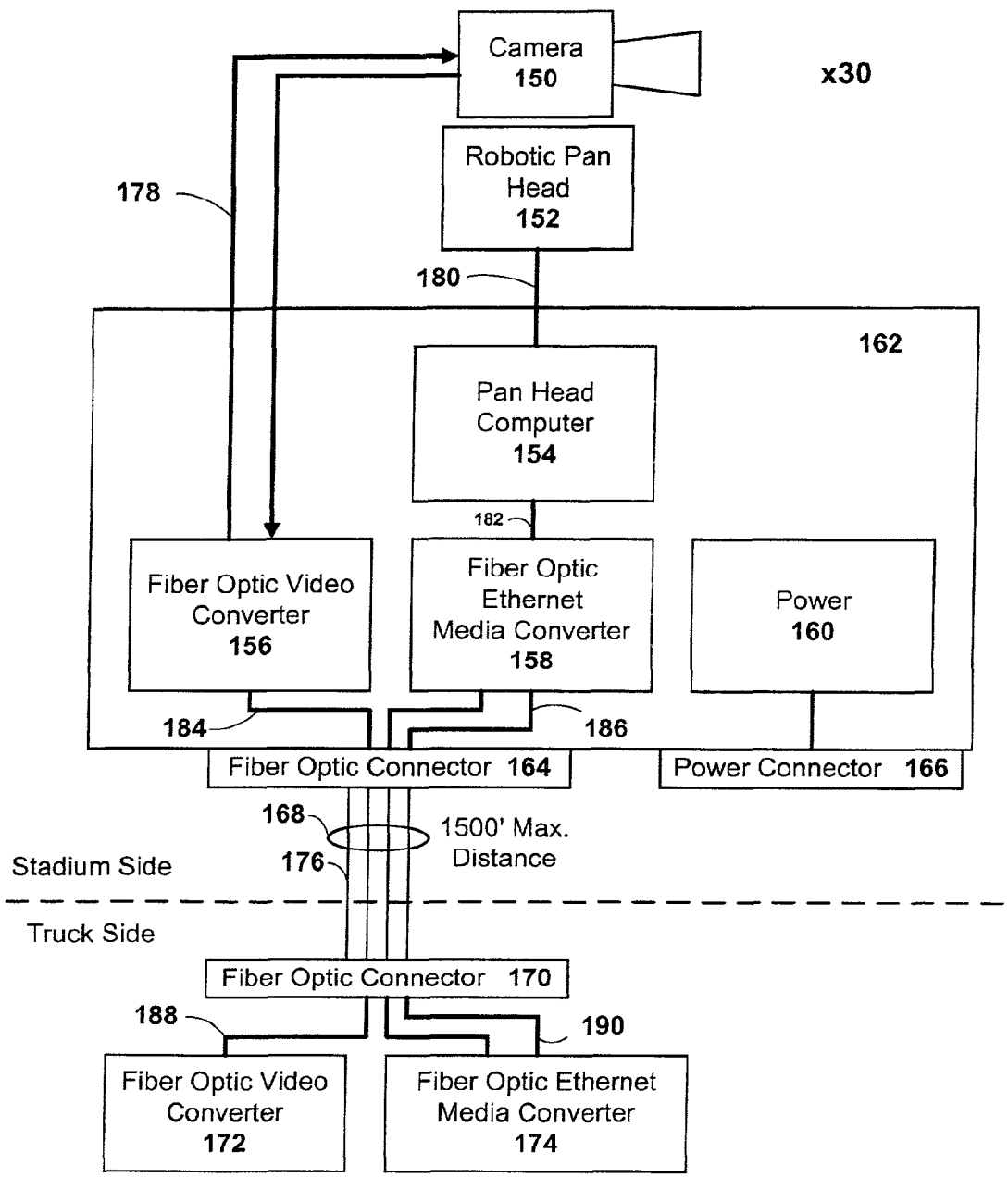

| Data Point Number | Dimension 1 | Dimension 2 | Dimension 3 |
|---|---|---|---|
| 1 | 0.00000 | 0.00000 | 0.00000 |
| 2 | 3.54900 | -49.66800 | -16.87400 |
| 3 | 14.41400 | -41.77300 | -16.92300 |
| 4 | 25.29200 | -33.91100 | -16.98800 |
| 5 | 28.86000 | -31.33600 | -17.01400 |
| 6 | 35.65300 | -48.28600 | -16.97100 |
| 7 | 24.78700 | -56.14000 | -16.90800 |
| 8 | 13.89700 | -63.97600 | -16.86500 |
| 9 | 23.69700 | -82.67100 | -13.33500 |
| 10 | 38.43500 | -97.96300 | 16.83600 |
| 11 | 45.22400 | -114.78100 | -16.80500 |
| 12 | 48.70900 | -112.20900 | -16.80600 |
| 13 | 59.62900 | -104.34500 | -16.90800 |
| 14 | 70.51000 | -96.49200 | -16.97800 |
| 15 | 74.06200 | -93.93600 | -16.98600 |
| 16 | 49.30300 | -90.07200 | -16.88600 |
| 17 | 60.17300 | -82.23200 | -16.97500 |
| 18 | 50.3100 | -63.38900 | -13.53000 |
| 19 | 102.04500 | -99.03300 | -15.03400 |
| 20 | 38.10100 | -145.24200 | -14.68600 |
| ❖ | ❖ | ❖ | ❖ |
| ❖ | ❖ | ❖ | ❖ |
| ❖ | ❖ | ❖ | ❖ |
| 45 | -40.58200 | -43.27300 | -7.67700 |
| 46 | -29.19100 | -35.00900 | -7.69400 |
| 47 | -18.16500 | -26.99000 | -7.61300 |
| 48 | -18.16000 | -26.98400 | -7.61700 |
| 49 | -5.41000 | -17.87900 | 07.78400 |
| 50 | 7.16400 | -8.68200 | -7.63800 |
| 51 | 7.17500 | -8.67800 | -7.64400 |
| 52 | 18.46900 | -0.57900 | -7.74700 |
| 53 | 18.45200 | -0.59700 | -7.76100 |
| 54 | 29.82600 | 7.58300 | -7.71100 |

Fig. 13

CAMERA PARAMETERS FILE FOR CAMERA NUMBER 1

ID number 01
Initial pan, tilt -18.078802  26.650000
Calibration information
Calibrated 1
Location -40.273  -305.950  99.497
;Four Corners

| | | | | | | | | | |
|---|---|---|---|---|---|---|---|---|---|
| 0 | 0 | 0 | 0.000 | 0.000 | 0.000 | 0.000000 | 0.000000 | 000 | 000 |
| 1 | 0 | 0 | 0.000 | 0.000 | 0.000 | 0.000000 | 0.000000 | 000 | 000 |
| 2 | 0 | 0 | 0.000 | 0.000 | 0.000 | 0.000000 | 0.000000 | 000 | 000 |
| 3 | 0 | 0 | 0.000 | 0.000 | 0.000 | 0.000000 | 0.000000 | 000 | 000 |

Number of GRID points 51
;GRID Points

| | | | | | | | | | |
|---|---|---|---|---|---|---|---|---|---|
| 0 | 1 | 1 | 0.000 | 0.000 | 0.000 | 0.650000 | 24.840000 | 255 | 226 |
| 1 | 1 | 1 | 0.000 | 0.000 | 0.000 | -1.362334 | 24.106688 | 255 | 226 |
| 2 | 1 | 1 | 0.000 | 0.000 | 0.000 | -3.230000 | 23.350000 | 255 | 226 |
| 3 | 1 | 1 | 0.000 | 0.000 | 0.000 | -3.790000 | 23.149117 | 255 | 226 |
| 4 | 1 | 1 | 0.000 | 0.000 | 0.000 | -6.050000 | 24.224957 | 255 | 226 |
| 5 | 1 | 1 | 0.000 | 0.000 | 0.000 | -4.270000 | 25.040001 | 255 | 226 |

;Range vs. Focus Table (inverse range vs focus param)
Number Entries 9
0.000000000000   227
0.003005353501   227
0.003266036045   226
0.003510695882   226
0.003540278412   226
0.003738491796   226
0.003873184789   226
0.004175557755   226
;Zoom vs. Field of View Table
Number Entries 256
000   49.740
001   49.740
002   49.740
003   49.740
004   49.740
005   49.740

ⱯⱯⱯⱯⱯⱯⱯⱯⱯⱯⱯ

250   3.020
251   3.020
252   3.020
253   3.020
254   3.020
255   3.020
Zoom Table Corrections
Max_Zoom_Value - 230
Min_Zoom_Value - 30
Min_Zoom_Useable - 31
Max_Zoom_Value_Fov - 2.080
Min_Zoom_Value_Fov - 34.000
Min_Zoom_Useable_Fov -7.480

Fig. 14

VIDEO SYSTEM AND METHODS FOR OPERATING A VIDEO SYSTEM

CROSS-REFERENCE TO RELATED APPLICATIONS

This application is a divisional of U.S. patent application Ser. No. 10/008,077, filed on Nov. 8, 2001 and entitled "VIDEO SYSTEM AND METHODS FOR OPERATING A VIDEO SYSTEM". The entire content of that application is incorporated herein by reference.

BACKGROUND OF THE INVENTION

1. Field of the Invention

The present invention relates to video systems and methods of operating such systems, and more particularly, the invention relates to video systems employing a plurality of cameras to produce images of a target object from various spatial perspectives.

2. Description of the Background

In the televised broadcast of live events, it is frequently desirable to replay portions of the events for further analysis and/or to enhance the viewing experience. One example, the familiar instant replay feature, is used in televised sporting events to review sports plays. By replaying video taken by cameras at different locations, it may be possible to obtain a better view of the event than was provided by the camera selected for the original broadcast.

Multiple camera imaging has been the subject of several issued patents. For example, U.S. Pat. Nos. 5,729,471 and 5,745,126 disclose a multiple camera television system in which an object of interest (target object) can be viewed from multiple spatial perspectives using cameras that provide different views of a scene.

However, such multiple camera television systems have typically utilized fixed position cameras. In the telecast of live events, target objects are often in motion, and it is desirable to be able to move the camera to follow the movements of particular objects. Furthermore, when replaying video clips of events such as sporting events, it may be further desirable to be able to view the events from multiple spatial perspectives.

SUMMARY OF THE INVENTION

In at least one preferred embodiment, the present invention provides a camera system and method of operation of the camera system that uses multiple cameras to produce video images from multiple spatial perspectives. The system may also permit the replay of those images to view an event from different spatial objectives.

The system preferably includes a plurality of video or other cameras located at various spatial locations around a target object, such as a sports stadium or athletic field. Each of the cameras may include a robotic mount allowing for the remote control of the positioning, zoom, focus, and/or other aspects of the camera. One camera is selected as the current master camera, and the remaining plurality of cameras are robotically controlled as slaves to the master camera which follow the master camera's field of view from different spatial perspectives.

The plurality of cameras may be controlled from a remote location which includes a master pan head used to directly control the selected "master" camera. As the master pan head is moved and adjusted as reflected in a local video monitor, a master broadcaster computer sends information (collectively, "telemetry") to the actual master camera by way of a fiber optic, tri-axial, wireless RF, or other communications connection. The master broadcaster computer also uses a software program to calculate new positional coordinates and camera settings for each of the plurality of "slave" cameras so that each of the plurality of cameras is capturing an image of the target object as defined by the camera operator at the remote master pan head.

The video signal captured by each of the plurality of cameras is preferably stored in a plurality of digital disc recorders (DDRs), a file server or other storage device. The DDRs may be connected to a digital router capable of outputting the content of any of the DDRs. A slow motion controller connected to the DDRs and/or the router allows a broadcast engineer to move forward and backward at varying speeds through the stored content as well as to select which of the plurality of cameras is to be output from the router. By selecting to output the video feed from adjacent cameras in quick succession, the output image gives the sensation of "spinning" or "rotating" around the target object. The selected series of images from the plurality of cameras can then be broadcast directly to air or can be re-recorded for further editing or pre-production with the aid of an additional slow motion controller and storage device.

The system may also include one or more calibration stations capable of calibrating the positioning of the multiple cameras used to capture the video images. The calibration station preferably includes a software program running on at least one calibration computer that allows dynamic calibration of the positional coordinates and other attributes for each of the plurality of cameras.

The present invention may also include a zoom calibration program that allows the multiple slave cameras to adjust the zoom size (field of view) based on the positional coordinates of the target object and the zoom size of the master camera. This zoom calibration allows the target object to appear as the same size in the video frames from each of the cameras when the video output is rotated through adjacent cameras. Likewise, there may also be a focus table and focus calibration program.

There may also be one or more paint stations including computer programs capable of adjusting the iris level, color settings, shutter speed, and other attributes of each of the plurality of cameras. This program may include the functionality to simultaneously change the attributes of all or a selected group of the cameras. These results are preferably communicated to the cameras by way of the master computer.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 8 is a system diagram of the camera system and the camera control system;

FIG. 13 shows an exemplary data file with absolute positional coordinates (raw data);

FIG. 14 shows an exemplary data file for a camera with calibration, zoom, and focus tables;

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

The present invention contemplates, in at least one preferred embodiment, a system and method for a multiple camera video system. The system remotely controls a plurality of cameras in a master/slave relationship to capture images of a target object from multiple spatial perspectives. These multiple video feeds may thereafter be played back from a storage device and further edited to produce replays with the functionality to rotate around the target object as the object is in motion.

A brief overview of the system will first be given from a high level of abstraction. Thereafter, a more detailed discussion of the overall system as well as each of the system components will be described. Finally, examples of system use will be provided to more specifically point out how the system components work together.

Figure 1:
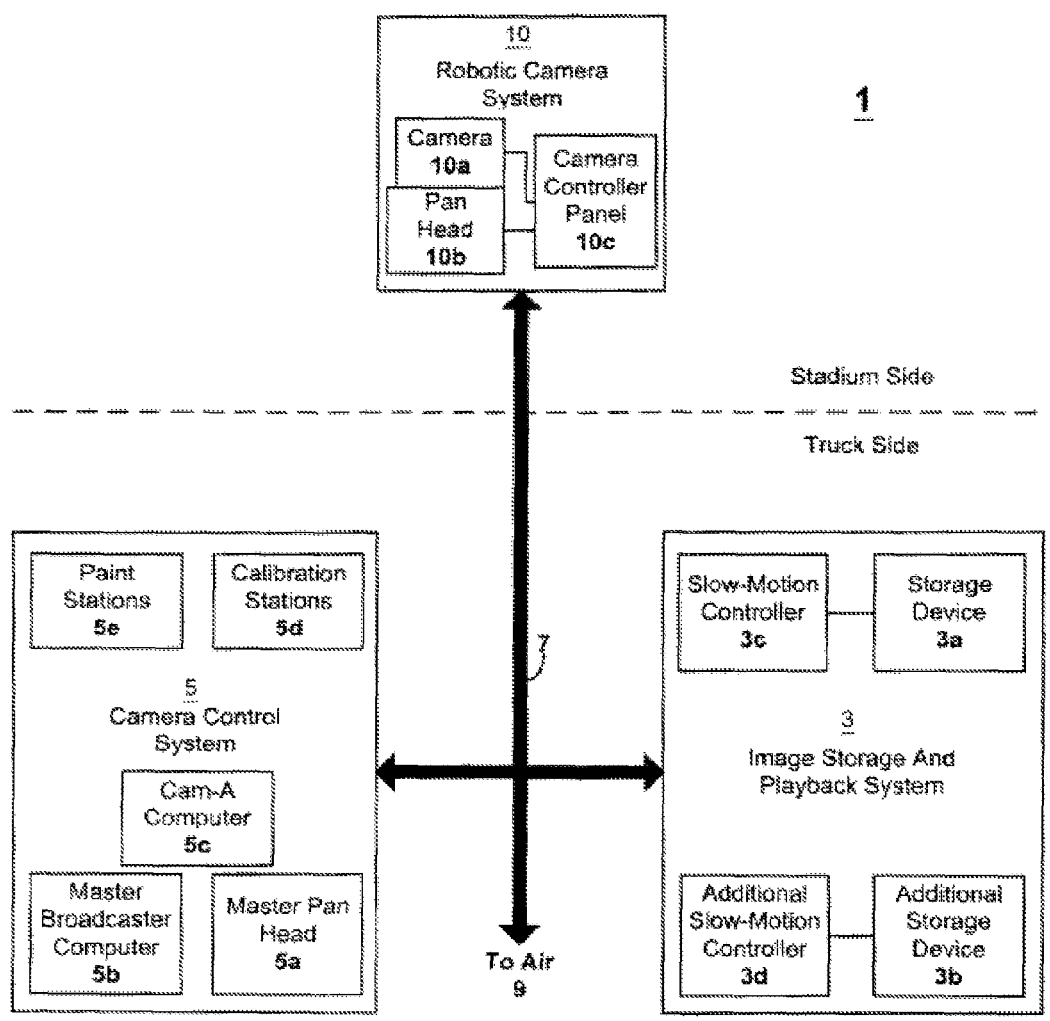
FIG. 1 is a top level block diagram of the components of a multiple camera video system.

Referring to the drawings, FIG. 1 is a block diagram of the general system components of the present invention. The FIG. 1 multiple camera video system 1 includes a robotic camera system 10 for capturing video of a moving target object from a plurality of spatial perspectives, an image storage and playback system 3 for recording the captured images and producing replay video feeds, and a camera control system 5 for calibrating and remotely controlling each of the cameras of the robotic camera system 10. The camera system 10 may be communicatively coupled to the other systems 3, 5 by way of a fiber optic, triaxial, RF wireless, or other medium 7. The camera control system 5 and the image storage and playback system 3 may exist at the same location, for example in a broadcast truck, or various parts of either system 3, 5 may be located remotely from other system components.

The cameras 10a are preferably mounted on robotic pan heads 10b that allow for remote control of the positioning (pan, tilt), zoom and/or other camera attributes. Each camera 10a also has a camera controller panel 10c associated with the camera that provides power and communications capabilities to the cameras 10a. Positioning signals are brought up to the cameras 10a, and the captured video feed is sent back down to the components of the camera control 5 and the image storage and playback systems 3. The following description refers generally to video cameras, however, it should be understood that such cameras could be standard resolution cameras, high definition video cameras, and/or other devices capable of capturing video image signals.

The camera control system 5 includes the components used for calibrating, positioning, and/or adjusting various attributes of the cameras 10a. The camera control system 5 preferably comprises both communications elements (e.g., Ethernet media and fiber optic video converters) and control elements. There may be a master pan head 5a with a mounted monitor that allows a camera operator to remotely control a selected "master" camera by moving the master pan head 5a. There may also be a master broadcaster computer 5b capable of calculating the correct pan, tilt, zoom, and/or other camera attributes for the master and slave cameras and communicating these values up to each camera 10a. There may be a cam-A computer 5c that provides visual feedback and functionality about the master camera. Additionally, the camera control system 5 preferably comprises one or more calibration stations 5d and paint stations 5e to set up and adjust the various attributes of the cameras 10a.

The image storage and playback system 3 includes the components needed to store the captured video from each of the plurality of cameras 10a as well as the functionality to produce instant replays and other video feeds from this captured video. An operator of the image storage and playback system 3 is able to produce a video segment while controlling the speed, camera position, and/or movement (forward or backward) of the stored video. This functionality may be implemented using one or more video storage devices 3a, 3b (e.g., Digital Data Recorders "DDRs") and one or more slow motion controllers 3c, 3d. The produced video segment may then be broadcast to air 9 or re-recorded for further production.

Figure 2:
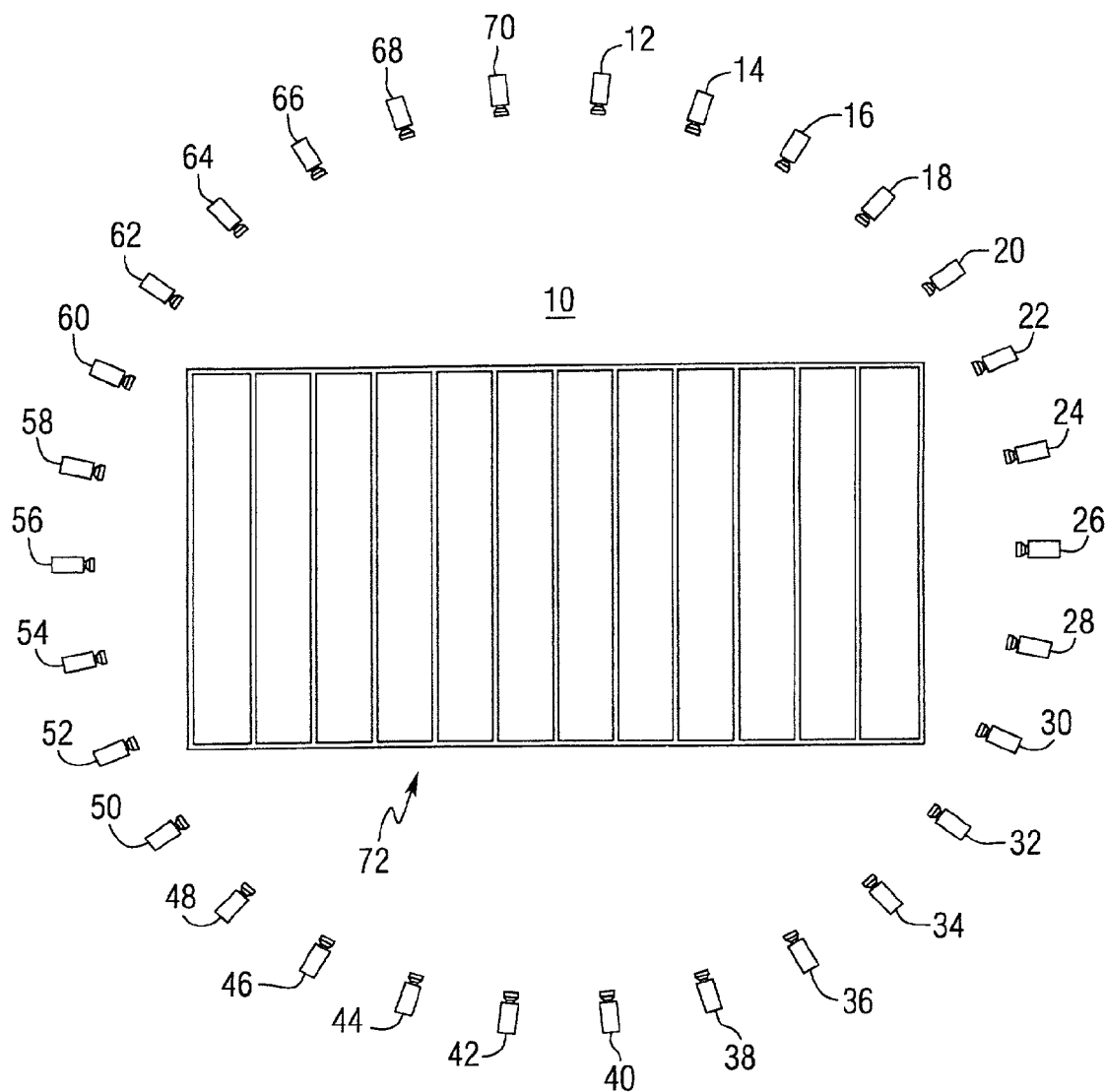
FIG. 2 is a schematic representation of an exemplary camera system.

FIG. 2 is a schematic representation of an exemplary camera system 10 constructed in accordance with at least one presently preferred embodiment of the invention as applied to a television broadcast of an American football game. The system includes a plurality of television cameras 12, 14, 16, 18, 20, 22, 24, 26, 28, 30, 32, 34, 36, 38, 40, 42, 44, 46, 48, 50, 52, 54, 56, 58, 60, 62, 64, 66, 68 and 70 positioned at different locations around the field of play 72. These cameras may be mounted to the stadium structure or other secure location, and are preferably raised well above the field level for the best vantage of the target object on the field. While this example shows the use of thirty cameras, it should be understood the invention is not limited to a particular number of cameras, and a greater or lesser number of cameras may be used within the scope of the invention. The cameras are located at spaced positions to provide video images of various target objects in the field of play from various spatial perspectives. The cameras may also include microphones that transmit sound along with the captured video.

The multiple camera system of the present invention generally operates by selecting and controlling one of the plurality of cameras, thereby making it the "master" camera, from a remote master pan head which may be located in a broadcast truck. The camera operator uses the master pan head to position the master camera to follow a target object on the field of play 72. For example, the target object during a football game may be the football or a particular player on the field 72. As the camera operator utilizes the master pan head to select and control a master camera to follow the target object, information signals representative of the master pan head's (and therefore the master camera's) positional movement, focus and framing are sent from the pan head to the master broadcaster computer. This information is then used by the master broadcaster computer to calculate actual positioning coordinates and other attributes for the master camera. These values are also used by a geometric transform function in the master broadcaster computer to calculate positioning coordinates and other attributes for each of the remaining "slave" cameras (all cameras except for the current master camera) so that all cameras in the system will be capturing video of the same target object with approximately the same size field of view. The camera that is designated as the master camera at any one time is preferably selectable from any of the system cameras.

Figure 3:
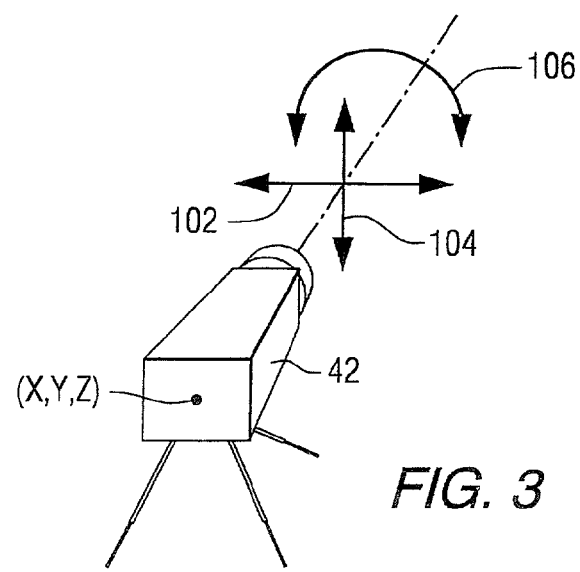
FIG. 3 is a schematic representation of exemplary camera control attributes.

In order to achieve coordinated operation of all of the cameras, the camera control system 5 must be provided with information about each camera, such as its location with respect to the field of play (or collected calibration points on the field of play), vertical and horizontal orientation, field of view, focus distance, and/or other characteristics. FIG. 3 is a schematic representation of an exemplary camera 42 for use in a system constructed in accordance with the present invention. FIG. 3 shows the various camera parameters that preferably are known, such as the location of the camera in 3D space (shown as coordinates X,Y,Z) and parameters that can be controlled by the associated camera control system 5 (such as the pan direction 102, the tilt direction 104, and/or the rotational angle 106). The pan, tilt and rotational angles of the individual cameras can be controlled by mounting the cameras on a robotic pan head or mount with the position of the platform being controlled automatically by various arrangements of servo motors and mechanical couplings. The focus and zoom functions can also be controlled remotely as described below.

The location of each of the cameras with respect to the scene to be imaged (e.g., the field of play) or with respect to each other may be determined using known techniques, such as by using a surveying theodolite, a global positioning system (GPS) device, a triangulation method or some other device/method to determine the location of the cameras with respect to predetermined landmarks in the scene, such as the corners of a football field. For accuracy in the camera control system 5, each camera should be calibrated based on a series of captured calibration points on a computer-created texture map of the field of play. Such a calibration texture map may account for local irregularities in the field of play, such as the pitcher's mound on a baseball diamond.

Once the locations of all of the cameras are known, this information can be combined with other calibration information to create a geometric transform function used by the master broadcaster computer to repeatedly calculate settings for each slave camera based on information retrieved from the master pan head (or directly from the master camera). These setting are preferably calculated approximately 120 times per second. These settings (e.g., pan, tilt, zoom, focus, etc.) will be communicated by the master broadcaster computer to the individual camera controller panels to position and focus the slave cameras and to adjust the framing so that the object of interest is substantially the same size in each of the video images produced by the cameras. These transform functions are based on rudimentary geometric relationships between the cameras and between each camera and the field of play.

In at least one preferred embodiment, the master camera is remotely controlled by a master pan head used to follow a target object on or around the field of play. The target object should be positioned within a portion of the camera's field of view referred to as the "sweet spot." The sweet spot would typically be near the center of a camera's field of view, but through the use of appropriate signal processing, other parts of the field of view could be used. The framing of an object at the sweet spot may change in relation to the action being shot. For example, at the beginning of a football play, the shot might be wider to include most of the players, but as the focus is narrowed to one or two players, so would the framing of the master camera, and thus the slave cameras.

As the master camera tracks the target object, the slave cameras are automatically controlled to track the target object in a manner that permits subsequent viewing of the various images recorded by the cameras. That is, the automatically controlled slave cameras should focus on the target object and adjust the field of view so that the target object is substantially the same size in the images recorded by the various cameras. In the preferred embodiment, the captured images would be stored in a digital disc recorder or file server for further production and editing, as in an instant replay.

Figure 4:
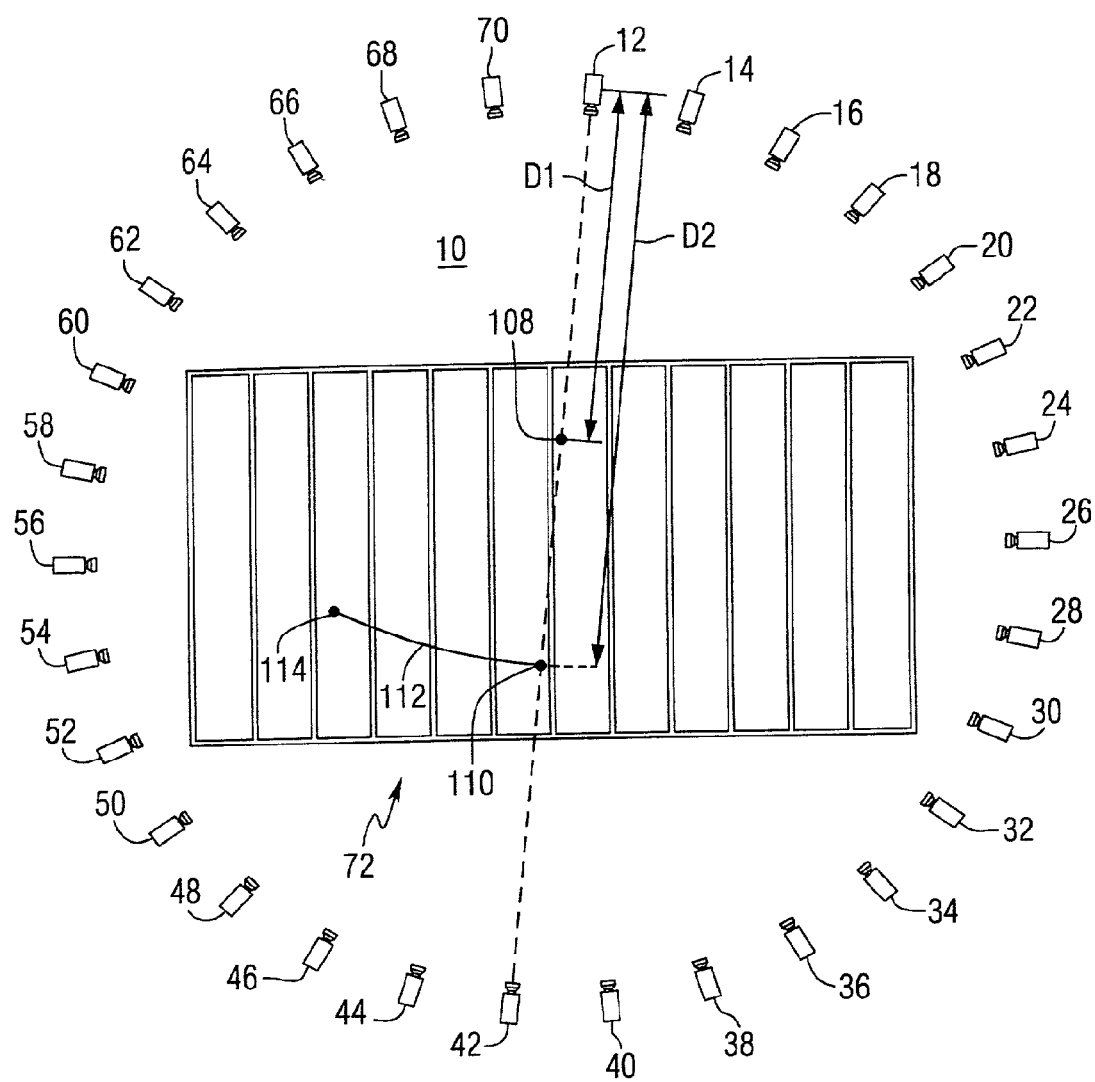
FIG. 4 is a schematic representation of a master camera following a target object across a field of play.

The operation of the invention can be further described by referring to FIG. 4. In FIG. 4, assume that camera is the currently selected master camera and is initially focused on a target object, such as a football player at location 108. By using known locations of the slave cameras 14-70, the distance Dl from camera 12 to location 108 and the framing size (or zoom) information for camera 12, the master broadcaster computer can calculate the information needed to direct all of the additional (slave) cameras 14-70 to focus on the target object 108 and to adjust the frame size so that the target object appears to be substantially the same size in the video images produced by each of the cameras 12, 14-70. This calculated information is then sent to the camera control panels associated with each of the additional cameras, and the camera control panels move the cameras to the correct position.

If the target object moves in a straight line from location 108 to location 110, the tilt angle of the master camera 12 will change to follow the object. If the field of view is not changed at the master camera 12, the target object will appear smaller due to the increased distance D2 between the master camera 12 and the target object 110. Slave camera 42, which is located directly across the field from the master camera 12 will be directed to change its tilt angle to follow the target object and will also have to increase its field of view (zoom out) so that the target object is substantially the same size in the image produced by camera 42 as it is in the image produced by the master camera 12. All of the other cameras 14-40, 44-70 will be directed to change their tilt angle, pan angle and/or zoom to image the target object 110 from their respective spatial perspectives and to ensure that the target object is substantially the same size in their respective images as in the image produced by the master camera 12.

If the target object 110 subsequently moves along line 112 toward point 114, the distance D2 between the object of interest and camera 12 does not change, and assuming the that the framing size remains constant, the size of the object in the image produced by camera 12 will remain the same. However, since the distance between the target object 114 and all of the other cameras 14-70 has changed, all of the other cameras will have to adjust their zoom to keep the size of the target object in their images substantially the same as in the image produced by the master camera 12.

An example of a general method for determining the geometric relationships between the cameras and the field, and for determining the position of a target object based on a camera's positioning and a height intercept will now be described. These relationships can be used by a computer program in the master computer (or elsewhere) to calculate positioning, zoom, and other camera attributes of both the master camera and the various slave cameras. These relationships form the basis of the master broadcaster computer's transform functions. Although a stepwise process is detailed below, these relationships are shown for exemplary purposes only, and the actual transform function utilized by the master broadcaster computer should not be limited to any particular methodology.

Figure 5:
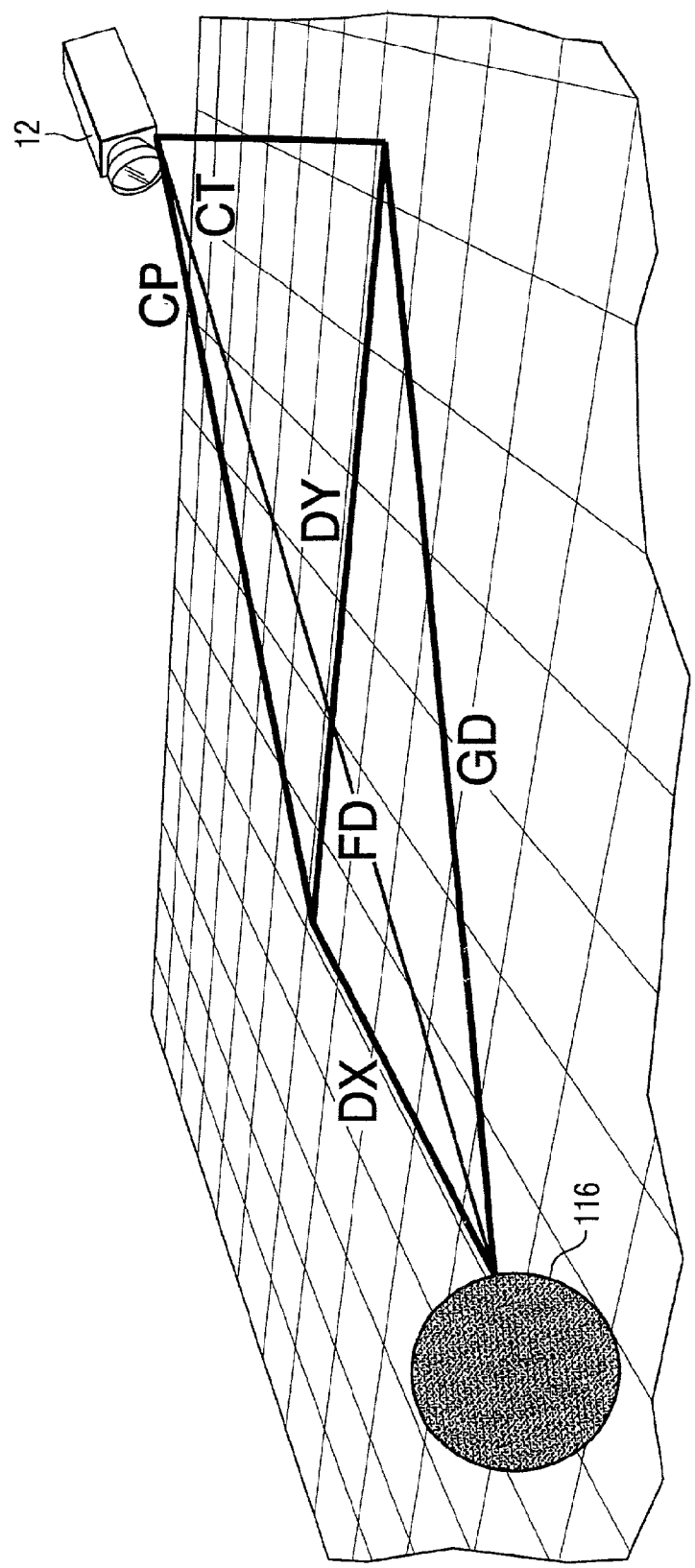
FIG. 5 is a schematic representation of the geometric relationships between a camera and a target object.

FIG. 5 is a schematic representation of the relationships between a camera 12 and a target 116 on the playing field. First the target's location with respect to a master camera can be determined. The master camera tilt angle (CT) can be used to calculate the line of sight distance, or focal distance (FD), and ground distance (GD) from the master camera, using the following formulas where Z is the height of the master camera above the X,Y plane (the field as determined by the calibration program).

$$Z/TAN(90-CT)=GD$$

$$Z^2+GD^2=FD^2$$

Once the focal distance FD and ground distance GD are known, the camera pan information (CP) can be used to calculate the X and Y coordinates of the target. This is determined by finding the difference in the X position between the master camera location and the target location (DX) and the difference in the Y position between the master camera location and the target location (DY) using the following equations.

$$GD*SIN(CP)=DX$$

$$GD*COS(CP)=DY$$

Then the camera's position in the world (CX,CY) can be added to (DX,DY) to obtain the real world target coordinates of (TX,TY). The opposite transform function (i.e., determining the camera tilt CT and camera pan CP angles from the position of a target on the field and the location of the camera 12) could be calculated by performing the reverse of the above equations. This may be useful in calculating the telemetry settings for the plurality of slave cameras once the location of the target object is known (see, below).

Additionally, the target object 116 may be at some height above the playing field (as determined by the calibration program). For example, to focus on a player's waist, the camera 12 will be pointing at an intersection point with the playing field that is beyond the player. By using height offsets, the above calculations could still be used to perform the transform functions.

Zoom information for the master camera 12 can be arrived at in two ways. Either by the master broadcaster computer telling the camera zoom what field of view is desired or the computer getting the information from the camera zoom. In this example we will have the master broadcaster computer control zoom based on field of view (FV). The focal angle (FA) of the lens can be found using the formula:

$$90-A\ TAN\ 2(FV/2,FD)=FA$$

The above steps provide all of the information needed from the master camera 12. This information can now be used to control the "slave" cameras by reversing the calculations. First, the robotic slave camera positioning system must be told where to point. The position of the slave camera in the world coordinates is (CX,CY,Z).

The difference between the slave camera position and the target position (DX,DY) in the X,Y plane can be determined using the following formulas:

$$TX-CX=DX$$

$$TY-CY=DY$$

The difference in positions in the Z direction is found by subtracting the Z coordinate of the target (the vertical intercept) from the Z coordinate of the camera. Then the ground distance (GD) between the slave camera and the target can be found using the formula:

$$(DX^2+DY^2)^{1/2}=GD$$

The Camera Tilt (CT) angle can be found using the formula:

$$90-A\ TAN\ 2(GD,Z)=CT$$

The Camera Pan (CP) angle can be found using the formula:

$$90-A\ TAN\ 2(DX,DY)=CP$$

The Camera Focal Distance (FD) can be found using the formula:

$$(GD^2+Z^2)^{1/2}=FD$$

The Focal Angle (FA) can be found using the formula:

$$90-A\ TAN\ 2(FV/2,GD)=FA$$

The CT, CP, FD, and FA are then sent to the slave camera robotic positioning system, which will cause the slave camera to track the target and match the framing of the master camera. All of these calculations are preferably made using computer software, for example running in the master broadcaster computer. The above geometry-based discussion is used as the basis of the program, but any number of specific programs could be written to perform these functions. There are various ways in which this program could be written by one skilled in the art.

The multiple camera video system of the present invention may be particularly suitable for providing improved video replay images during a sports broadcast. The video images of an event of interest from the plurality of cameras will be stored in a suitable storage medium, such as a digital data file, digital disc recorders, or tape. To produce a replay of an event, one of the video images will be played until a particular video frame of the event of interest is depicted in the video. At that time, the video will be frozen to display the particular video frame. The display may then switch among frames in the video images that were produced by the other cameras. The frames of the video images that were produced by the other cameras may be frames that correspond in time to the originally selected frame, or they may be other frames, such as those recorded at successive or previous instants in time. Since the video images have been recorded from different spatial locations, that in the preferred embodiment encompass views surrounding the scene, this will effectively rotate or spin the object being displayed.

The cut between video sources can be done in a number of well-known ways, for example using a routing switcher such as the Grass Valley SMS 7000 or the Pesa Jaguar. Once a desired degree of rotation has been achieved, the video images from the camera positioned at the location viewing the desired angle of view can be played to continue full motion video or may be further edited. As an alternative to rotation of a frozen image, for some applications, such as where a single target object, or a small number of objects are located near the sweet spot, moving video can be displayed by switching among the video images from the various cameras.

Figure 6A:
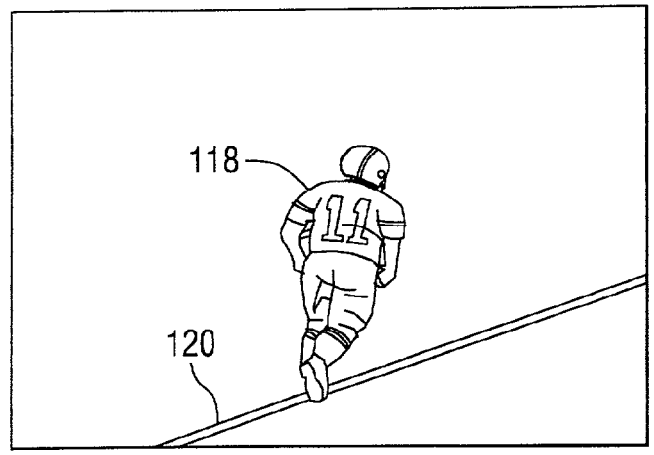
FIG. 6 (6a-6e) shows simulated frames of video images that illustrate the operation of the present invention in a video replay mode.
Figure 6B:
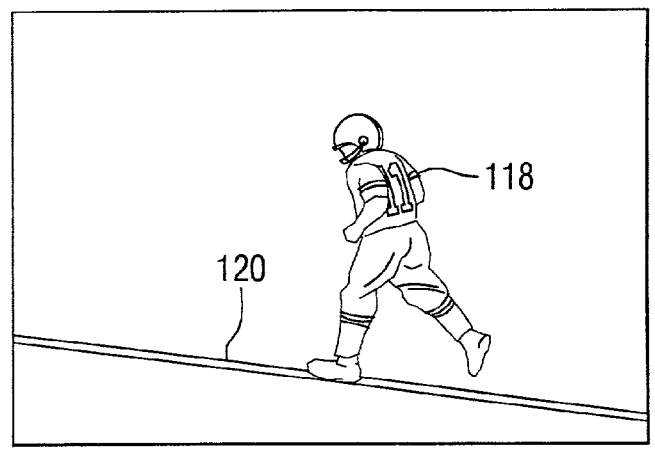
Figure 6C:
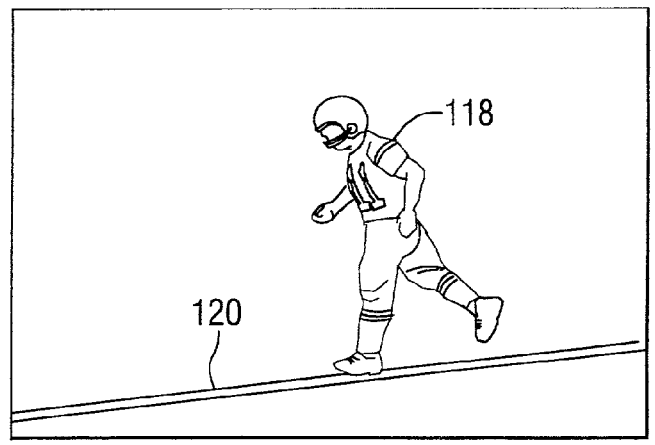
Figure 6D:
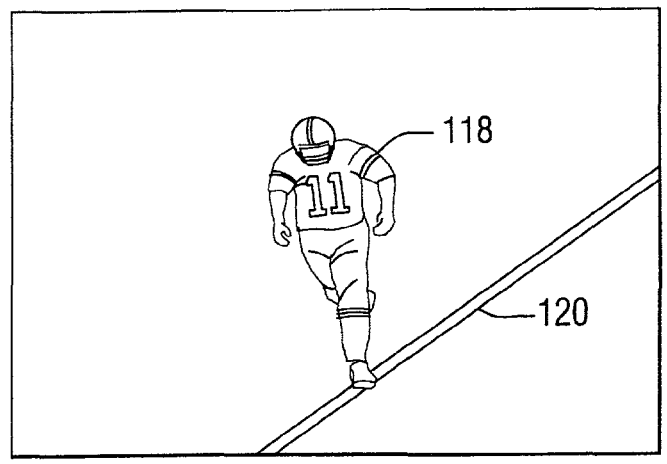
Figure 6E:
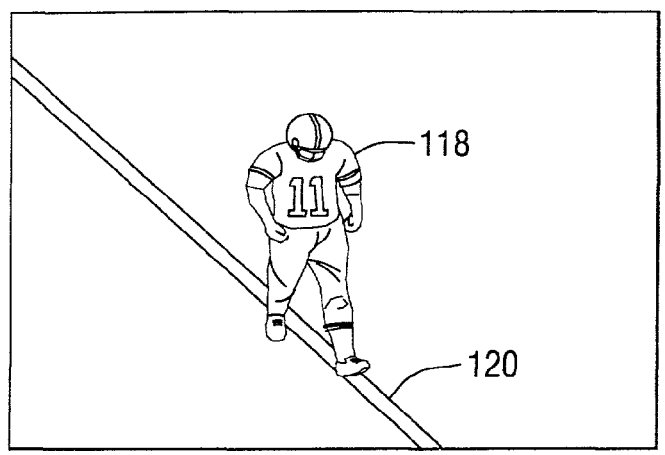

FIGS. 6a, 6b, 6c, 6d and 6e are simulated frames of video images that illustrate the operation of the present invention in a video replay mode. Assume that video images produced by camera 26 in FIG. 2 are displayed on a monitor. The viewer wishes to see if player 118 has stepped on sideline 120. As the player approaches the sideline, a particular frame of the video produced by camera 26 is selected and shown in FIG. 6a. In the frame of FIG. 6a, the viewer cannot see if the player's left foot has hit sideline 120. To achieve a better view, the corresponding frame produced by camera 34 is shown in FIG. 6b. In this frame it is apparent that the player's foot has touched the line 120. FIGS. 6c, 6d and 6e shows the corresponding frame from the video recorded by cameras 42, 48 and 56 respectively. It should be apparent that by switching among corresponding frames of images recorded by the various cameras, the image of the player is effectively rotated or "spun" on the display. Once a particular frame has been selected from the available frames, the full motion video can be resumed by running the video recorded from the camera that recorded the selected frame.

Figure 7A:
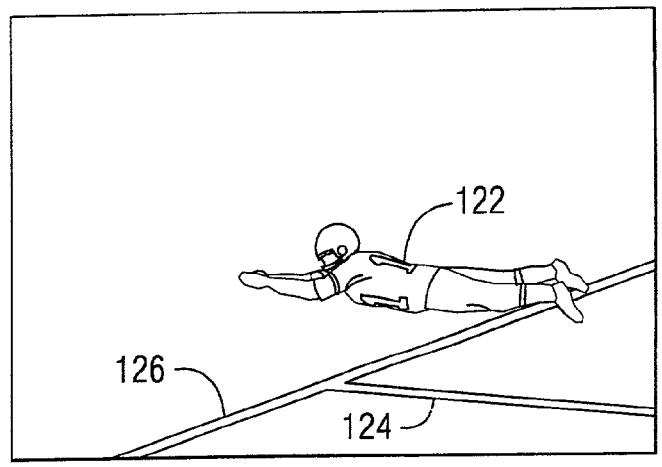
FIG. 7 (7a-7e) shows simulated frames of video images that further illustrate the operation of the present invention.
Figure 7B:
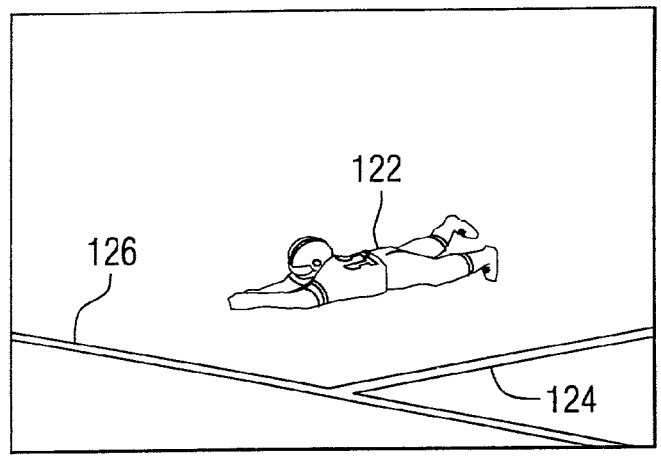
Figure 7C:
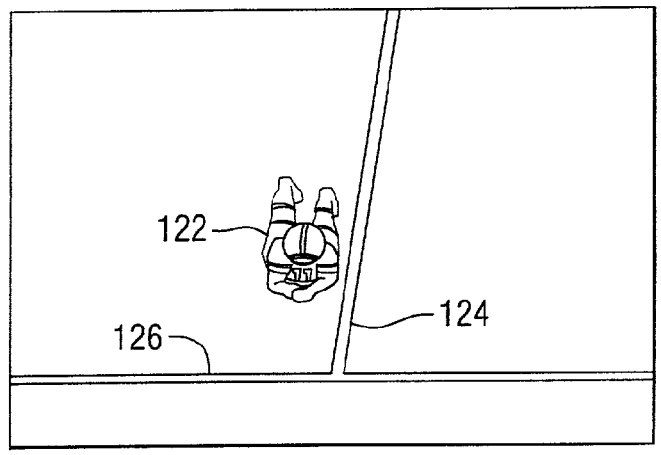
Figure 7D:
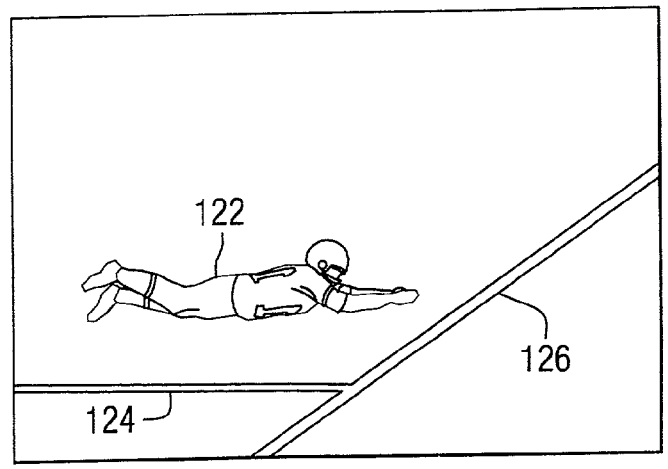
Figure 7E:
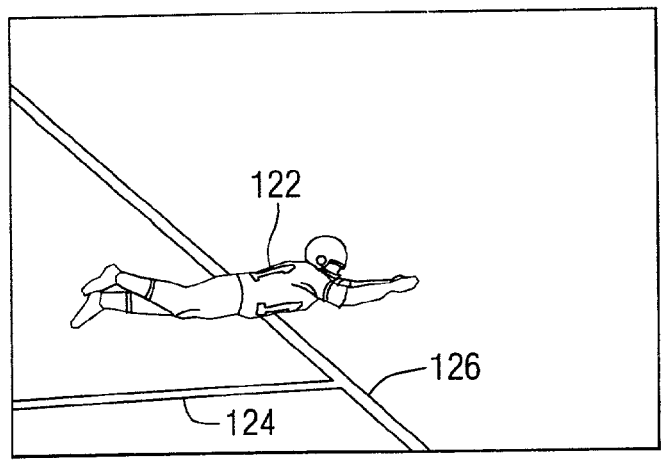

FIGS. 7a, 7b, 7c, 7d and 7e are simulated frames of video images that further illustrate the operation of the present invention. In these frames, the viewer desires to determine if the player 122 has crossed line 124 at the time that he crossed the sideline 126. FIG. 7a is a frame from the image recorded by camera 26. From the spatial perspective of camera 26, the viewer cannot tell if the player has crossed line 124. FIG. 7b is a frame recorded from camera 32. Here again, the viewer cannot tell if the player has crossed line 124. By switching to the frame recorded by camera 36, as shown in FIG. 7c, the viewer can clearly see that the play is to the left of line 124. FIGS. 7d and 7e show corresponding frames recorded from cameras 48 and 58, respectively. FIGS. 7a, 7b, 7c, 7d and 7e again illustrate how the invention uses a frozen image to effectively rotate the image on the display to provide information that might not be obtained from a fixed camera position.

With additional signal processing, synthesized ("virtual") video images can be created by interpolating information in images taken by different cameras to produce views from spatial perspectives where cameras do not actually exist. Such synthesis can result in smoother transitions between images when the object of interest is rotated in the display. For example, interpolation software available from Realviz Corporation could be used to perform the necessary image interpolation.

This invention can be used as part of a live broadcast or as a replay device, giving a 360° view of an object or objects. To use the invention in connection with a sporting event, cameras can be installed either at field level or at some point above the field level such as the mezzanine level of a stadium. The video images provided by the camera system of this invention are similar to a virtual camera that can revolve around an object, as the object remains frozen or is in motion. The image produced by the master camera can be framed wide or tight, and the images produced by the additional cameras will automatically track the image produced by the master camera.

This invention further encompasses the detection, recording and playback of point specific audio. By placing microphones at some or all of the camera locations such that the microphones receive sound from the direction of the field of view of the cameras, audio signals can be produced and fed to the computer for processing. Since the computer will have information concerning the position of the microphones, the audio signals produced by these microphones can be processed to produce an audio output signal representative of sound being produced at a particular location in the area occupied by the event being recorded.

For example, since the distance from the camera to the object of interest can be calculated as shown above, if a microphone is mounted at the camera location, the time required for sound produced in the vicinity of the target object to reach the microphone location can be calculated. Since the microphones are located at various distances with respect to the object of interest, the sound produced in the vicinity of the target object will reach the microphones at different times. By adding a time delay to the signals produced by the microphones to account for the differences in distance from the microphones to the vicinity of the target object, and subsequently combining the signals (for example by adding the signals using a digital mixer), the sound produced in the vicinity of the target object can be recovered. This will produce an audio signal having a higher signal to noise ration than an audio signal produced by any of the individual microphones.

The above description provided a general overview of a multiple camera video system according to the present invention and methods associated therewith. To aid in the understanding of the invention, and to point out additional features and components, the following description provides a more detailed explanation of at least one presently preferred embodiment. This discussion is intended to work in conjunction with the above description.

Figure 11:
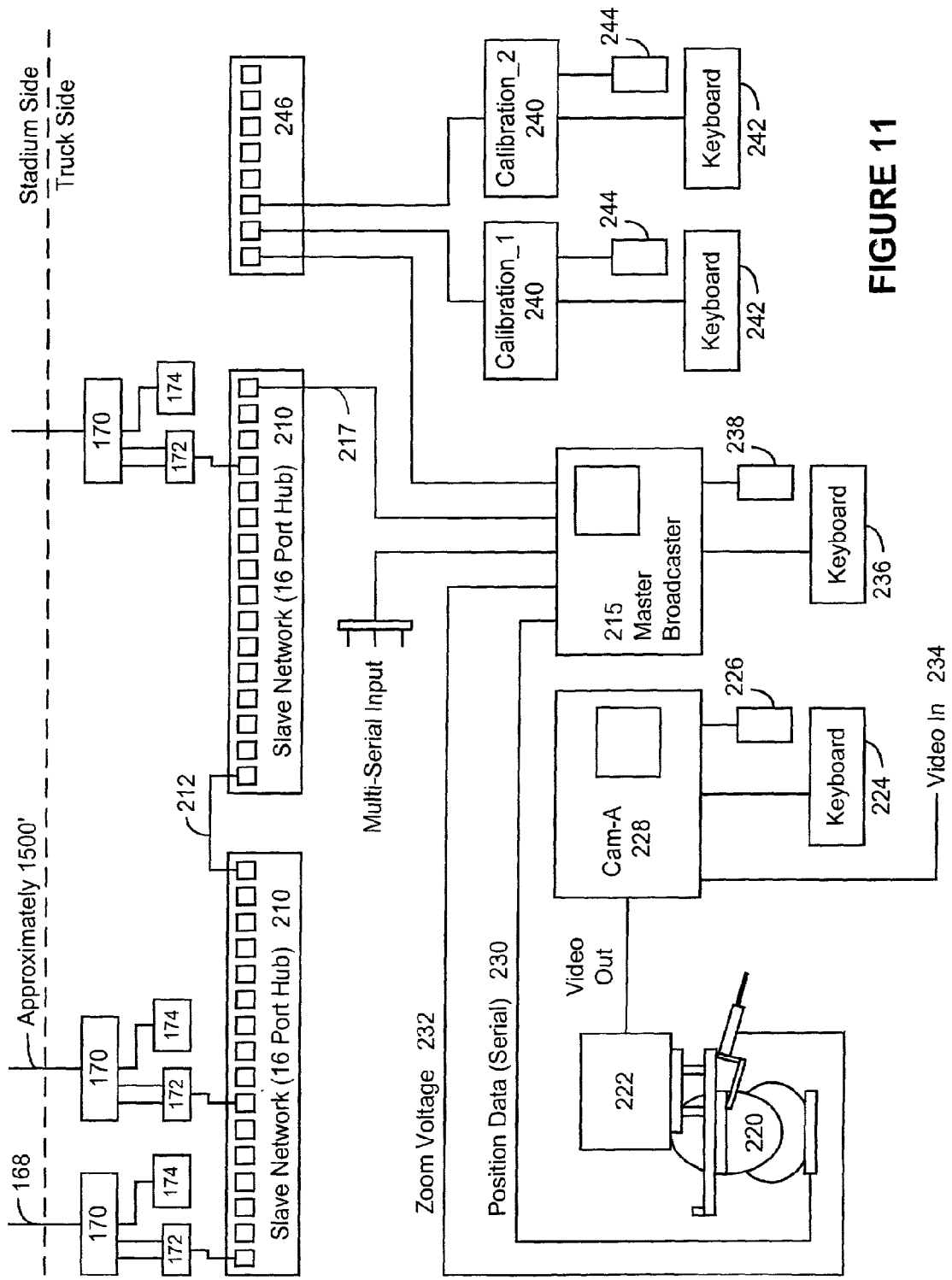
FIG. 11 is a schematic of one exemplary embodiment of a camera control system.
Figure 17:
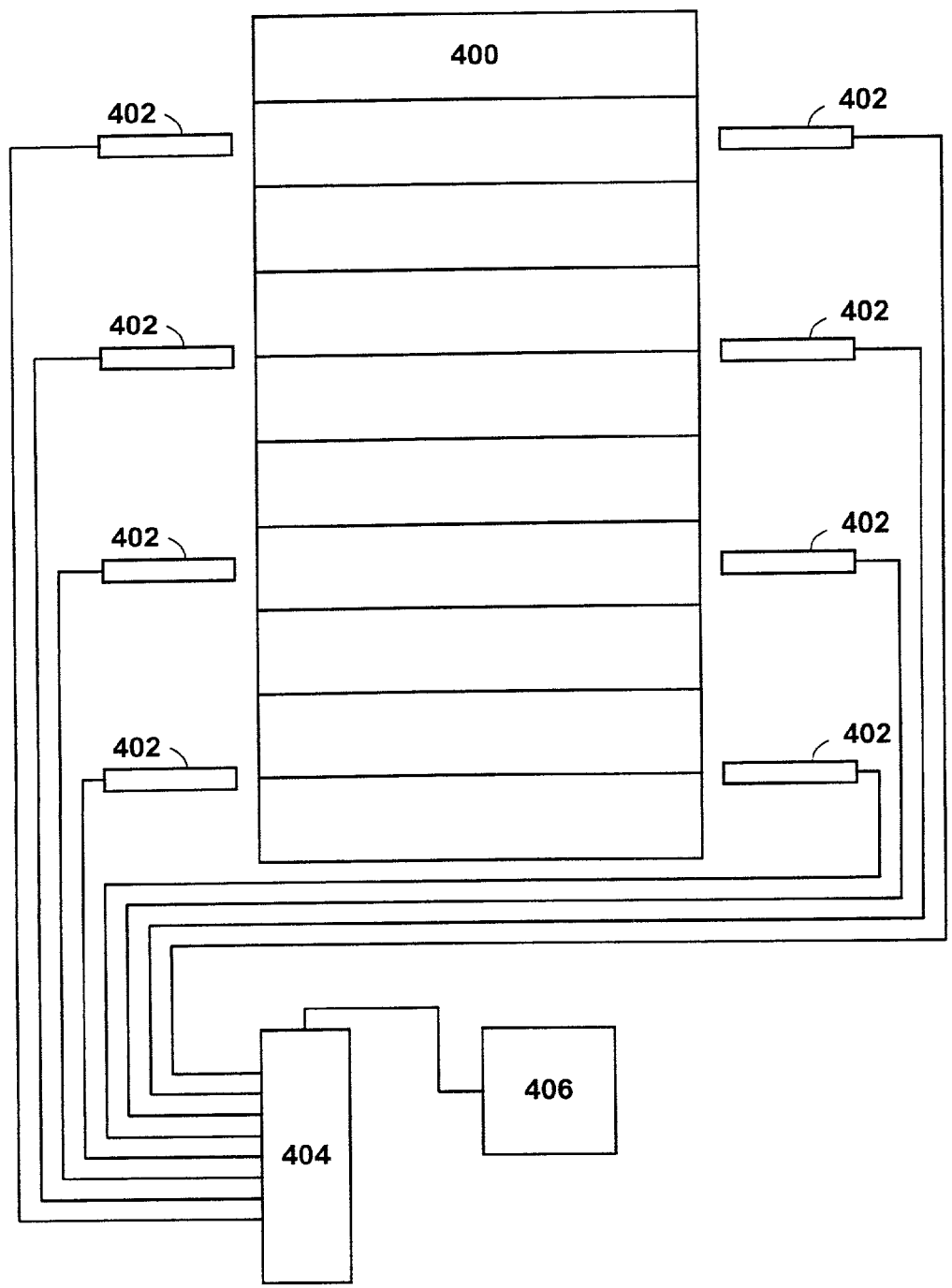
FIG. 17 shows a schematic view of a football field with a plurality of spaced microphones.

FIG. 8 details a system diagram for one exemplary embodiment of the camera system 10 with connection to the camera control system 5 of the present invention. FIG. 11 shows how the camera system 10 is connected to the camera control system 5, and FIG. 17 shows how this system is connected to the image storage and playback system 3. FIG. 8 includes system elements that are mounted around the target event (e.g., the cameras and communications devices) as well as exemplary communications connections to elements that may exist in a production truck or other site (e.g., master pan head and master broadcast computer). These two sides of the system are denoted "stadium side" and "truck side" in FIGS. 1 and 8, however, most components may exist at almost any location given the proper communications connections. The camera system 10 shown in FIG. 8 is preferably replicated at 30 locations around the stadium.

The cameras 150, mounted around the stadium or arena, may be conventional video cameras, high definition video cameras, or any other imaging device. The cameras 150 are preferably mounted on a robotic pan head 152 or other mounting devices that remotely control the movement of the cameras. FIG. 8 shows a pan and tilt head 152 operatively coupled to the camera 150. A pan and tilt head 152 typically includes at least two axes of motion (one pan, one tilt) that allow control of the camera 150 over these multiple axes of motion. A third axis of movement, rotation, may also be included.

Figure 9:
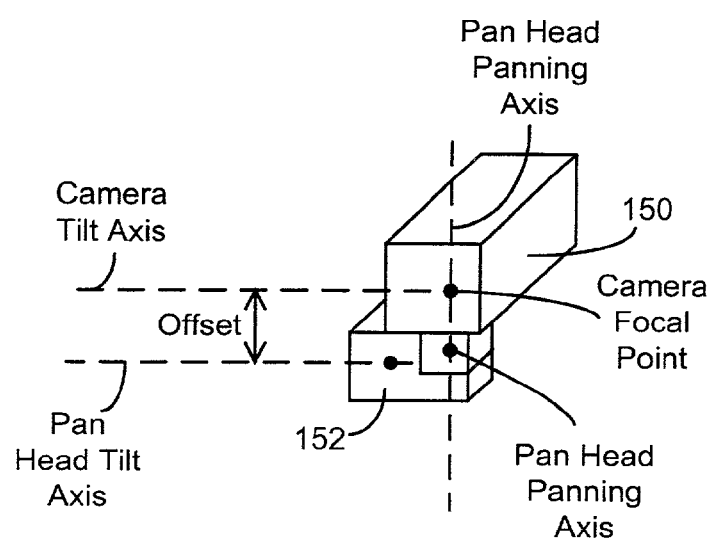
FIG. 9 shows an exemplary robotic pan head.

FIG. 9 shows one exemplary embodiment of a robotic pan head 152 for use with the present invention. As seen in FIG. 9, the panning axis (horizontal plane) is shown directly vertical from the center of the camera 150 (the lens focal point). This is a preferred orientation because the camera lens will always be the same distance from this axis throughout its entire range of motion and no offset compensation is necessary as the camera 150 pans. The FIG. 9 pan head 152 shows a tilt axis (vertical plane) that is not in line with the center of the camera lens. Therefore, as the camera 150 tilts through its entire range of motion, the lens will be at varying lengths from the target object, which may slightly affect the ability of the captured image to align with the images of the other cameras. It is preferred to either compensate for this tilt length offset in a computer program that processes the image or to utilize a pan head 152 where both the tilt and pan axes intersect the center of the focal point of the camera 150.

Each camera 150 has a camera control panel 162 associated therewith which provides power to each camera and two-way communications between the camera and the control 5 and storage 3 systems (collectively hereafter the "truck side" of the system). In the camera control panel 162 mounted near each camera 150, there is also preferably a pan head computer 154 that controls the pan and tilt of the pan head 152. This computer 154 preferably takes commands for remotely controlling the pan head 152 and translates them into instructions upon which the pan head can operate. The computer 154 may also translate current pan head positioning into a form that the truck side of the system 1 can analyze.

The video or other imaging signal that is captured by the camera 150 is converted by a video converter such as the fiber optic video converter 156 shown in FIG. 8. This video converter 156 accepts the video feed in a format dependent on the camera 150 and converts it to a signal that may be carried by a fiber optic cable. Such converters 156 are well known in the art.

The video converter 156 may also receive information from the truck side of the system 1 through a fiber optic cable and convert this information into a format that the camera 150 can understand. For example, zoom, focus, and paint information may be provided from the truck to each camera 150 to adjust for various objects to be targeted and environmental changes (e.g., cloud cover). Additionally, a genlock signal (described below) may be provided to each camera 150 so that the resulting stored video will be synchronized across all of the camera video feeds during playback. In this way, the fiber optic video converter 156 translates the information transmitted over a distance from the truck to each camera 150 into a format the local camera can understand (and vice versa).

The camera 150, robotic pan head 152, computer 154, fiber optic video converter 156 and any other electronic components found locally near the camera typically need electric power to operate. FIG. 8 shows a power connector 166 through which power 160 may be supplied to the camera control panel 162.

Figure 10:
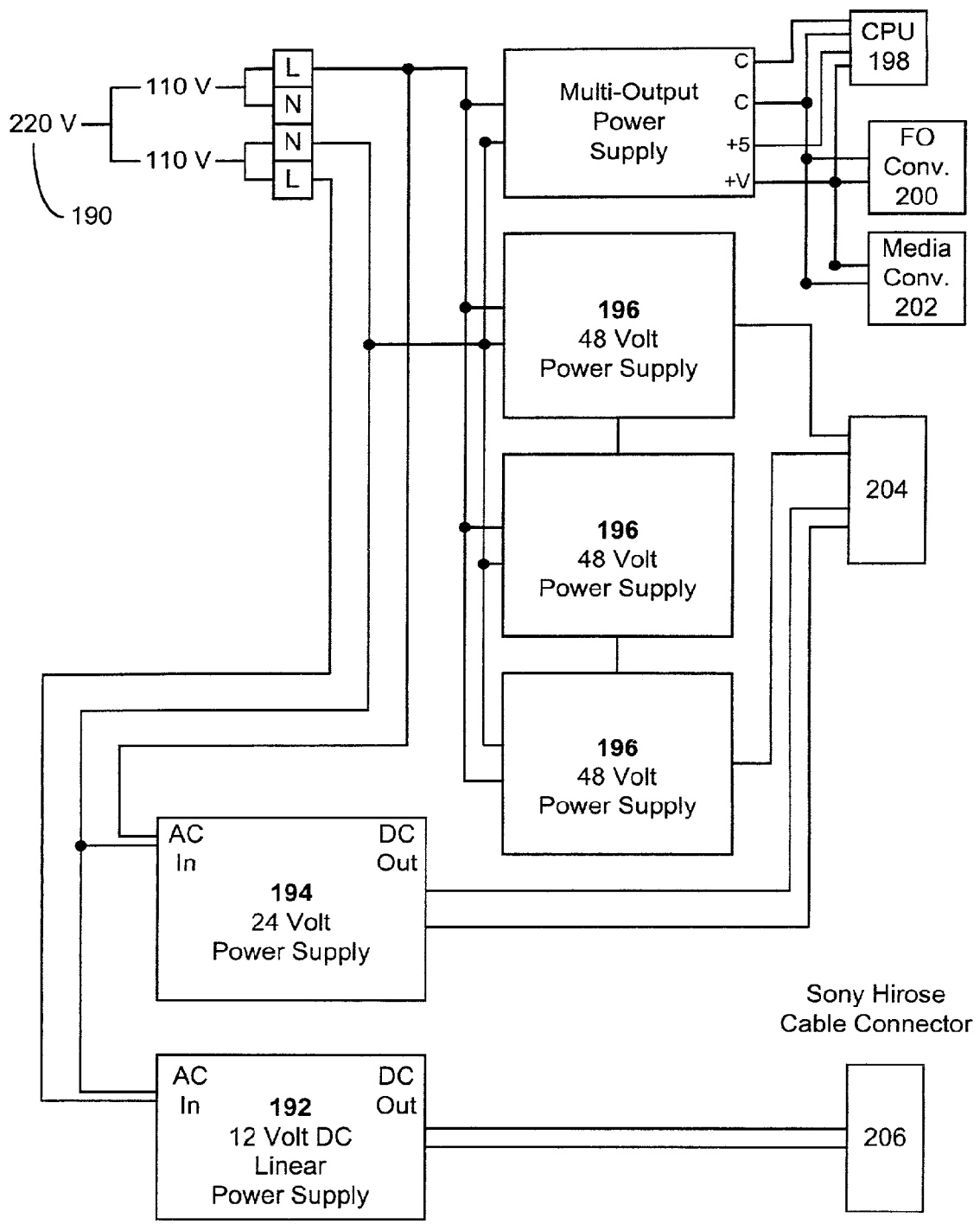
FIG. 10 is a schematic view of one exemplary embodiment of the wiring inside the camera controller panel.

FIG. 10 details a schematic view of one exemplary embodiment of the wiring inside the camera controller panel 162. FIG. 10 shows a 220 VAC power source 190 being fed into a 12V linear power supply 192, a 24 V power supply 194 and a series of three 48 V power supplies 196 connected in series. FIG. 10 also shows the power connector for the computer CPU 198, the fiber optic video converter (shown as a Fiber Option Media Converter) 200 and a fiber optic Ethernet media converter (shown as a Black Box media converter) 202. There is also an 8 pin connector 204 for the robotic camera mount and a camera power cable 206 (shown as a Sony Hirose Cable Connector for use with a Sony video camera).

Looking again at FIG. 8, there is shown a fiber optic Ethernet media converter 158. This media converter 158 takes the wired 182 Ethernet-based signal from the pan head computer 154 in the camera control panel 162 (which is connected 180 to the robotic pan head 152) and converts it into a fiber optic-based Ethernet signal 186 for transmission to the truck side of the system 1. This converter 158 can also convert fiber optic Ethernet signals received from the truck side of the system 1 and to regular wired Ethernet signals that may be used by the computer 154 in the camera control panel 162. The pan head computer 154 is communicatively connected to the pan head 152 for the transmission of pan head settings to the pan head and for the reception of actual pan and tilt values from the pan head.

For ease of installation and re-installation, the camera controller panel 162 preferably includes a fiber optic connector 164 and power connector 166 for which to provide a power cable (in this example a 220 VAC power cable) and fiber optic cable 168 to the truck or editing end of the system 1. In this example, three or four strands of fiber optic cable 168 may be run together (one 184 for the camera 150, two 186 for the robotic mount 152, and one spare fiber 176). FIG. 8 shows up to a 1500 ft. run of fiber optic cable 168 between each camera control box 162 and the truck side of the system. This maximum length is exemplary and is determined by the specific components and communications schemes used. The fiber 168 used for the bi-directional video feed is preferably multimode fiber. This fiber is used to send the genlock signal and other commands up to the cameras 150 and to receive the video feed back from the camera.

It should be noted here that the fiber optic system shown in FIG. 8 could be replaced by a variety of other cabling systems. Fiber optics are shown as a preferred embodiment because of the distance in which the data can travel, but a fiber optic system is also more expensive, more fragile and more difficult to install/uninstall than other types of cable.

Alternative communications mediums could include a triaxial or wireless RF scheme. Many sports stadiums already have triaxial cable run throughout much of the stadium to accommodate past television technologies. Installation of the triax may therefore be streamlined. A wireless RF scheme may also be used but could be limited by bandwidth considerations created by FCC guidelines. The usable bandwidth of triax or glass fiber is much greater than that of the available RF spectrum.

Triaxial cable generally includes an inner shield, an outer shield, and a semiconductor. In one embodiment of the present invention, the outer shield can be used as a ground, the inner shield can be used to supply power supply low, and the semiconductor can be at DC potential. To send signals over this medium, the signals are AC coupled to the semiconductor to be sent up to the cameras. A triax adapter can be used with an RF modulator to send video, audio, and telemetry. For example, the video feed could be modulated on a 50 MHz carrier, the audio could be modulated at 25 MHz and the telemetry could be modulated at 30 MHz. As is common with triaxial cable, this scheme replicates a wired RF communications scheme.

In much the same way, a wireless RF communications scheme could be used to transmit signals to and from the cameras. A similar transmission system to the triaxial system may be created, however FCC and any local governmental regulations must be followed for operation. Because the usable wireless spectrum is generally smaller than the wired (triaxial or fiber optic) counterpart, the wireless RF system may have to be based an a poorer quality signal (lower resolution) in order to accommodate all of the cameras on the reduced bandwidth. A modulation scheme in which one camera after another transmits video information, or in which only the selected master camera transmits information may also be utilized. However, to store information from each camera at all times (to completely archive the event), may necessitate a lower quality image being captured and sent to the truck side of the system.

The above camera system 10 (cameras 150, robotic pan heads 152, camera controller panels 162, and the communications scheme) is preferably repeated throughout a plurality of camera stations around the stadium as described above. The example in FIGS. 2 and 8 show 30 such camera configurations (denoted by "x30" in FIG. 8). It should be noted that any number of cameras may be used. As more cameras are used, the amount of "skip" between images when rotating from one camera to the next decreases. Therefore, a high number of cameras is preferred, but any number of cameras is contemplated within the scope of the present invention.

At the "truck side" (FIG. 1) of the present invention, there is preferably all of the components necessary to store and edit the video information captured by each of the plurality of cameras as well as the ability to create and communicate appropriate commands to instruct each of the cameras (and pan heads) as to positioning and camera attributes such as zoom, focus, various paint parameters and any other functionality that the user wishes to communicate to each of the cameras. These latter camera control system 5 components are now described with reference to FIG. 11.

Initially at the truck side of the system 1, there is a communications device capable of converting the signals transmitted to and from the camera into a usable format. In FIGS. 8 and 11, because a fiber optic communications system is depicted, there is a plurality of fiber optic Ethernet media converters 174 (connected to the fiber optic cable 168 through a cable connector 170) to convert the fiber-based signal into a conventional wired signal. There may also be a fiber optic video converter 172 for the video signal that is not shown in FIG. 11 (described below with respect to the storage and playback system 3). The plurality of wired Ethernet cables 111 are then routed through one or more hubs 210 (such as the Bay Networks 16 Port Hub shown in FIG. 11). Depending upon the number of cameras 150 used (and therefore the number of fiber optic cables 168 routed to the truck) a greater or lesser number of hubs 210 are needed. FIG. 11 shows two such hubs 210. In general, the truck-side communications devices (fiber optic video 172 and Ethernet media 174 converters) match similar elements (156, 158) found on the camera side of the system.

These various hubs 210 are preferably connected together (212) so that any one of the camera video signals may be sent as an output from these hubs 210 to one of the various truck side computers or components. In the same way, the Ethernet connection may also be used to transmit commands, coordinates or other information to the cameras 150 and robotic controller panels 162 at the camera side of the system.

The master broadcaster computer 215 is one of the main computer systems at the truck side of the system 1. The master broadcaster 215 is connected to each camera 150 through an Ethernet connection 217 to the daisy-chained hubs 210 and is connected to a master pan head 220 or camera mount that may be used to control the positioning of the various cameras 150.

The master pan head 220 is preferably a traditional camera mount that can be physically panned and tilted to position an attached camera in a conventional (studio-based) video camera system. In a preferred embodiment of the present invention, the master pan head 220 has a video monitor 222 (rather than a video camera) mounted on the pan head 220. A camera operator at the master pan head 220 can move the pan head 220 in various directions (pan and tilt) to remotely control a master camera which can be selected from any of the cameras 150 mounted around the stadium, arena or other location. The use of the master pan head 220 provides tactile feedback to the camera operator.

For example, the master pan head 220 may have a keyboard 224 and mouse 226 attached thereto which provide additional functionality to the master pan head 220. The camera operator may select a "master camera" from the 30 cameras 150 mounted on the stadium. This camera will then be remotely controlled by the camera operator and all of the other 29 "slave" cameras will be remotely controlled to follow that master camera (controlled by the master pan head). Typically, the camera operator will select a master camera using the keyboard 224 (for example by typing in the camera number or a pressing a hot key associated with the camera). The monitor 224 mounted on top of the master pan head 220 will then display the video feed from the selected master camera. Assuming that camera 1 is selected as the current master camera, the camera 1 video feed 178 will be converted by the fiber optic video converter 156 in the camera control panel 162, will be sent across the fiber optic cable 168 to the truck side fiber optic video converters 172, will be converted to a traditional wired signal, will pass through the cam-A computer 228 to the master pan head monitor 222.

The camera operator will therefore see an image on the monitor 222 mounted on the master pan head 220 (which is actually the video output of the cam-A computer 228) which is the image that camera 1 is capturing. As the camera operator moves the master pan head 220 (pan and tilt), the position data of the master pan head 220 is sent serially 230 to the master broadcaster computer 215 which then communicates this position data back up to the camera 1 robotic pan head 152 (via fiber optic cable 168 through the Ethernet converters 174, 158). The robotic pan head 152 will then move camera 1 150, in accordance with the movement of the master pan head 220 by the camera operator. The image captured by camera 1 will then be transmitted through the cam-A computer 228 to the monitor 222 on the master pan head 220, and the camera operator will see the movement as if he or she was standing right behind camera 1. In this way, the camera operator at the master pan head 220 can "directly" move a master camera by remote means.

As the camera operator moves the master camera with the master pan head 220, the master broadcaster computer 215 calculates pan and tilt coordinates to move each of the other 29 "slave" cameras in unison with the master camera (i.e., camera 1). Therefore, the master camera is directly remotely controlled by the camera operator and the slave cameras are indirectly controlled by the camera operator. The calculations in the master broadcaster 215 use a geometric transform between each of the slave cameras and a predefined mesh or calibration table (described below). Although this transform could be coded in a number of different ways, the calculation basically translates the master pan head settings and vertical intercept entered by the camera operator into a point in space 3-dimensional that is defined as the target object. The settings required for each of the slave cameras is then calculated using the camera-specific transform to convert this actual point in space to the appropriate camera settings (e.g., pan, tilt) as per the calibration table and transform.

In addition to the video signal from the cam-A computer 228 being sent to the monitor 222 above the master pan head 220 and the pan and tilt position data being sent from the master pan head 220 to the master broadcaster computer 215 (to be sent to the various robotic camera pan heads 152 after transformation), the master pan head 220 may also include a zoom controller that allows the camera operator to also control the field of view or zoom of the master camera. For example, a conventional pan head zoom control may be a rotatable stick that can be turned clockwise or counterclockwise to zoom in and out. As the camera operator turns the stick to zoom in and out, the master pan head 220 sends this zoom information 232 (typically as a data point representing a value between "no zoom" and "full zoom") to the master broadcaster computer 215. The master broadcaster computer 215 will then send this zoom information to the actual master camera (camera 1) so that this camera will appropriately zoom according to the camera operator's control. The master broadcaster will also calculate the appropriate zoom setting for all of the slave cameras mounted around the stadium. This zoom correction is important for a "spinning" video output from one camera to the next (described in more detail below). Without this updated zoom, the image would be enlarged and reduced randomly as the output is "spun" through the various cameras. This zoom setting calculation may be based on a zoom calibration table described below.

The master pan head 220 may also include a mouse 226 with a wheel used to adjust the intersection height above ground of the target image captured by the master camera. As described above with respect to general camera geometry, the image that a camera captures is along a straight ray (FD in FIG. 5) from the camera lens to the point on the ground at which the camera focal line FD intersects. However, the camera operator may be attempting to show a football player carrying a football. Therefore, the actual target image is approximately 4 feet off of the ground (the ball or the player's waist), but the focal ray FD of the camera will intersect the ground at a point on the ground past the ball carrier. In order to appropriately adjust the focus of the master camera and to determine the actual target object position in 3D space at which the slave cameras will point, the camera operator may spin the wheel on the mouse 226 to adjust the vertical height that is the intersection of this master camera focal ray FD with a vertical line from the ground. In the ball carrier example, a 4 foot intersection height may be appropriate. Depending on the angle of the camera focal ray with the ground, the intersection point can be calculated to find a true distance from the camera lens to the target image (the football). The focus on this camera can then be adjusted to this actual distance to the target object, rather than the distance to the intersection point with the ground. This focus adjustment preferably occurs based on a focus calibration table described below.

This height information may also be sent to the master broadcaster 215 so that the master broadcaster can determine the "actual" position in three dimensional space of the target object, so that the appropriate telemetry settings may be calculated for each of the slave cameras. This includes the appropriate focus and zoom information which must be calculated and sent to each of the slave cameras so that the target image is in focus from each of the cameras.

The cam-A computer 228 basically shows the video image output from the currently selected master camera. This video feed is sent to the monitor 222 at the master pan head 220 to help guide the camera operator and may further be sent to the broadcast truck to be sent to air or digital video storage. The cam-A computer 228 is preferably connected to the output of the Ethernet hubs 210 so that it may communicate with any of the cameras 150. The cam-A computer 228 preferably also includes a keyboard 224, mouse 226, or other input device (which may be used locally at the master pan head 220). There may also be a local monitor connected to the cam-A computer 228, and a second monitor 222 may be connected to the cam-A computer 228 and reside at the master pan head 220 (see above).

The cam-A computer 228 may also provide a heads-up display (HUD) for the camera operator at the master pan head 220. For example, when the cam-A computer 228 sends the currently selected video feed to the monitor 222 on the master pan head 220, the cam-A computer 228 may overlay crosshairs in the center of the video image to help guide the camera positioning. The HUD may also include the currently selected intersection height above ground for the target object.

The HUD may also include a list of positional function keys that are available to be selected by the camera operator at the master pan head 220. These positional function keys may be preset locations on the field of play, for example the pitcher's mound and each base of a baseball diamond. Each preset location may be set by aiming a camera at the selected location and using ESC-F1 or some other key stroke to save the location as positional hot key F1. At any point during the broadcast, the camera operator may then hit the F1 key on his keyboard to position the master camera (and hence all of the cameras) to the selected predefined position.

The cam-A computer 228 may be used to select the output of the plurality of video feeds from the various cameras to determine which signal will be output to the broadcast truck or for the air. This broadcast signal is represented as "video in" 234 in FIG. 11.

The master broadcaster 215 is the central computing facility in the multiple camera video system 1 of the present invention. The master broadcaster computer 215 preferably includes a keyboard 236, computer mouse 238, and/or any other computer input device. The master broadcaster computer 215 is the central communications device for calculating and determining the positioning and other characteristics of the various master and slave computers and for performing various other functionalities.

The general function of the master broadcaster 215 is to position each of the cameras. As described above, a camera operator can select one of the plurality of cameras 150 to be the (current) master camera, thereby making the other 29 cameras slaves. As the camera operator moves the master pan head 220, the pan, tilt, and/or other positioning coordinates are sent by the master broadcaster 215 to the selected master camera (with or without conversion depending on whether the information sent by the master pan head 220 matches the format expected by the robotic pan heads 152). At the same time, the master broadcaster 215 must calculate at what point in space (on the calibration texture map) the master camera is pointing, and calculate appropriate pan, tilt, and/or other positioning coordinates for each of the slave cameras. This calculation occurs because of a predefined data file that maps pan and tilt values for each camera to a texture map of the field, stadium, or other target surface. In this way, the master broadcaster 215 is the "brains" of the system. More on this will be discussed below after the calibration program is introduced.

FIG. 11 also includes one or more calibration computers 240 shown as calibration computer 1 and calibration computer 2. These calibration computers 240 may be used to calibrate the X,Y,Z axes of the cameras 150 so that the master broadcaster can remotely control these cameras through the fiber optic network.

Each calibration computer 240 preferably includes a CPU, a monitor, and a keyboard 242, mouse 244 and/or other input device. The calibration computer 240 preferably includes an Ethernet card or other communication device through which the computer 240 can exchange data with the master broadcaster computer 215. In the FIG. 11 example, the calibration computers 240 are connected to the master broadcaster 215 through a calibration hub 246 (e.g., Bay Networks 16 port hub).

The basic function of the calibration computers 240 is to calibrate the positioning of each of the remote cameras 150 enabling the master broadcaster 215 to remotely calculate and control the slave cameras in response to a movement in the master camera. Although this calibration is necessary before each event to be filmed (because the camera position will change), the calibration may be repeatedly checked and updated during the event to ensure smooth frame transition from one camera to the next camera. Because the cameras 150 are typically heavy, the pan head positioning can become incorrectly calibrated after continual motion of the camera during the event.

The calibration of each camera preferably includes relating the pan, tilt, and/or other pan head position settings to actual locations on the playing field or other target surface (actual X,Y positioning). This calibration is aided by a computer program running on the one or more calibration computers 240. Preferably, there is at least one calibration computer 240 for every five cameras to be calibrated. If a calibration engineer (running a calibration computer 240) has to calibrate more than five cameras, the updating may not be quick enough for real-time calibration during the filming of the event.

Figure 12:
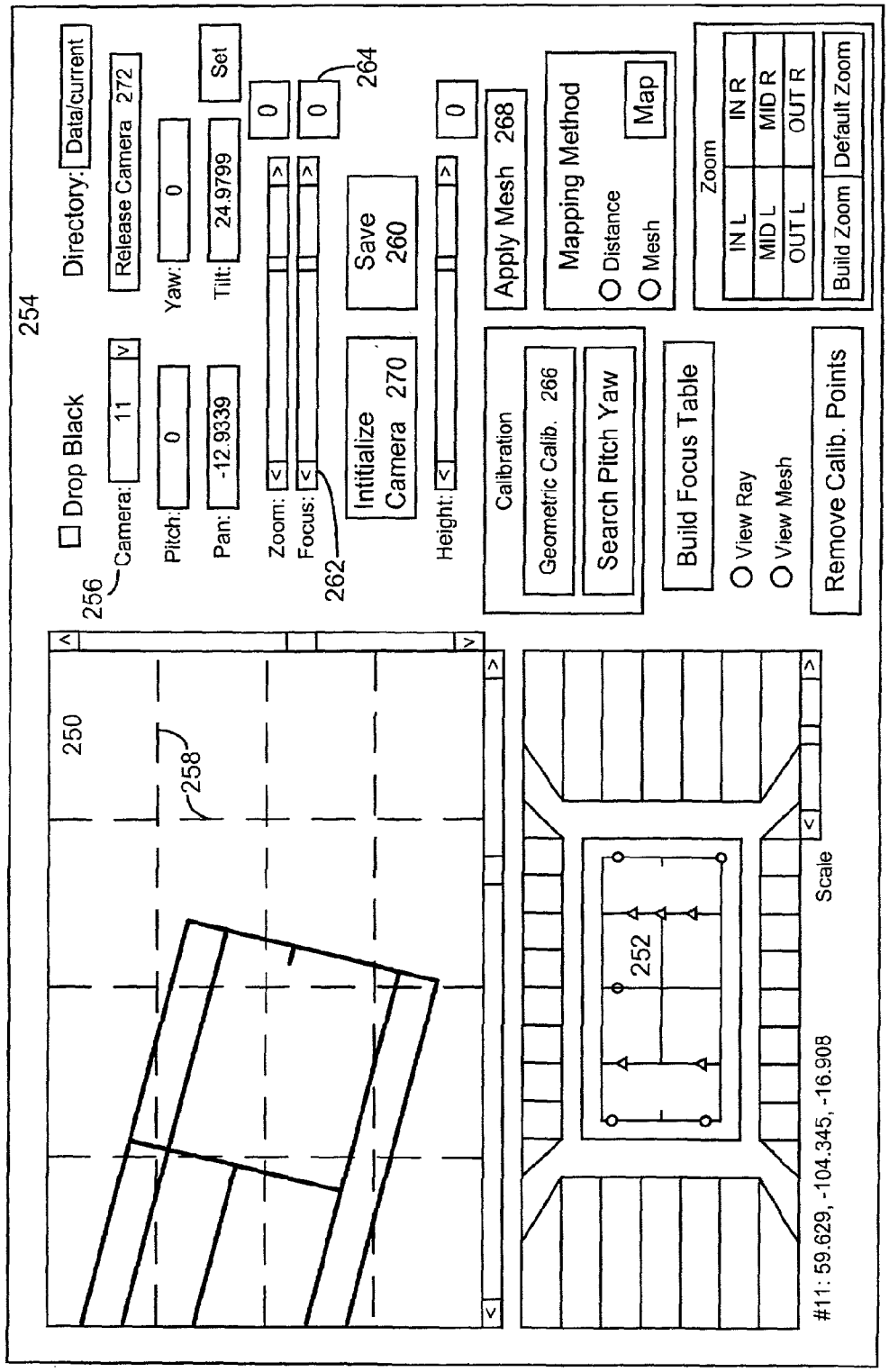
FIG. 12 shows a sample calibration computer program screen shot.

A sample calibration computer program screen shot is shown in FIG. 12. FIG. 12 includes a window 250 for showing the view from a selected camera to be calibrated, a view 252 of the stadium, field or other target surface, and a plurality of control buttons 254 for the calibration engineer to calibrate and set options for each camera. An exemplary calibration methodology utilizing a program with the FIG. 12 screen will now be described in detail.

The calibration program preferably creates a texture map of the playing surface which is associated with actual pan and tilt positioning coordinates for each camera (through the use of a transform function). Because each camera is at a different location around the field, each camera must be individually calibrated so that the master broadcaster 215 can point each camera in the appropriate location when the camera operator or other entity selects a certain location for viewing.

The first step in calibrating the cameras is to generate and store a set of data points for various locations around the playing surface of the target field. These data points should be real-world 3-dimensional coordinates that define the field of play. For example, an X,Y grid system in a horizontal plane could be used in conjunction with an azimuth or Z axis in the vertical direction. For generally flat playing surfaces (such as a tennis court), the Z axis may be estimated as flat, but this vertical axis may be important for crowned playing surfaces such as a football field or for uneven playing surfaces such as the pitchers mound of a baseball field. By capturing these real world coordinates in a texture map, and then correlating pan and tilt settings for the robotic pan head of each camera to these coordinates, a transform function can be written using basic geometric relationships to take any point in three dimensional space and calculate pan and tilt settings to aim a particular camera at that point.

The initial playing field mapping is carried out by selecting a plurality of points around the field and determining the actual coordinates in space. At each of a plurality of points, a theodolite, GPS global positioning device, or some other positioning device may be used to generate the absolute positioning coordinates. For example, an electronic theodolite may be moved from one point to the next and the absolute X,Y,Z coordinates may be automatically stored for later downloading into the calibration computer 240. Alternatively, a global positioning device may be placed at the series of points and the absolute positioning may be stored. A sample text file for the absolute (raw) data points is shown in FIG. 13 for a texture map made from 54 calibration points.

The number and placing of these calibration points may vary, but the texture map will be more accurate as the number of calibration points increases. Additionally, selecting easily identifiable (i.e., repeatable) points (such as the various corners and intersections of lines on a tennis court) make the calibration of each camera 150 easier. If each of the cameras 150 can not be directed at exactly the same calibration points, there may be some discrepancies between where each of the cameras 150 is pointed when the transform functions are employed. Therefore, accurate calibration may be important.

With reference to FIG. 12, a schematic picture of the field of play 252 (in this case a tennis court in a tennis stadium) may be downloaded to the calibration program and utilized as a quick reference for the acquired calibration points. Each of the acquired calibration points from the theodolite, GPS device, or other device are then mapped onto this schematic of the field of play 252 and represented as some symbol (such as a square). This bit map picture will not be used by the calibration computer, but may be useful to the calibration engineer for a quick reference of which point he is calibrating. The actual pan and tilt settings of each camera 150 must then be mapped to these absolute position coordinates for each of these calibration points so that a mathematical transform between each of the cameras and the absolute positional coordinates of the coordination points can be created for each camera.

After these absolute date points are captured, each of the plurality of cameras must be aimed at the location of each of the points, and the pan and tilt settings must be captured. These pan and tilt settings can then be used to generate the transform.

The calibration engineer initially selects a first camera (e.g., camera 1) for calibration. The calibration engineer may select this camera by a drop-down menu 256 on the calibration program or by some other means. Preferably, the view from the selected camera will then be displayed in the camera display window 250 on the top of the calibration program display. Utilizing the keyboard 242, mouse 244 or other input device, the calibration engineer preferably is capable of panning, tilting, zooming and/or focusing the selected camera to calibrate the camera.

The calibration engineer moves the camera to the first point captured by the theodolite, GPS device or other device. Preferably, the camera is zoomed to the maximum extent possible to make the point capturing as accurate as possible. As seen in FIG. 12, there may be crosshairs 258 on the camera display window in order to guide the calibration engineer in "aiming" the camera. Once the crosshairs 258 are aligned with the first calibration point, the actual pan and tilt coordinates of the robotic pan head 252 of the selected camera are preferably sent to a text file or other data file. Also, the vertical or Z coordinate may be read from the theodolite or absolute coordinate already captured. This data capturing may be implemented, for example, by selecting the "save" button 260 on the calibration software display. Saving this value inserts the pan, tilt and/or other settings into a text or data file such as that shown in FIG. 14 for camera 1. There is preferably a camera data file such as this for each of the cameras, and this data file is used to generate the geometric transform function used by the master broadcaster computer 215 to remotely control each of the cameras. The data files may also include a zoom table and focus table (described below), as well as any other pertinent information.

The pan, tilt, height (Z axis), focus and zoom may also preferably be directly entered by the calibration engineer by using the slider bars 262 or directly entering the data values 264 from the keyboard into the software. After the data values for the first calibration point are captured into the camera 1 data file, the calibration engineer moves the selected camera to the second calibration point. Again, the camera is preferably zoomed to its maximum extent to generate the most accurate values for the pan and tilt. Once the point is centered in the crosshairs 258 of the calibration display window 250, the point is written to the camera 1 data file as the pan and tilt settings for calibration point number 2.

All 54 (or any defined number) of the calibration points are preferably entered into the camera 1 data file this same way. The program is capable of creating the appropriate transform with less than all 54 points captured, but the more points entered, the better the resulting texture map transform function will be.

Once a sufficient number of points have been stored for the selected camera, the calibration engineer creates the texture map by selecting the "geometric calibration" 266 or other button on the calibration software display. This button 266 preferably initiates a program which calculates a geometric transform based on the various geometric relationships between each camera and the calibration points and the captured pan and tilt values. These geometric relationships are described in more detail above, but basically enable the master broadcaster 215 to use the transform values to calculate a pan and tilt setting for a camera based on a point in three dimensional space, and vice versa, if necessary.

There may also be a "mesh" functionality 268 that provides either a localized or field-wide texture mesh of the playing surface. The meshing function 268 draws a computer mesh between selected points to provide greater resolution at all points in the field for the transform functions. These local or field-wide meshes take into account height variations at different parts of the field or stadium (rather than assuming a flat surface). These meshes may be useful on a field-wide basis for uneven playing surfaces such as the crowned surface of a football field. The mesh can also be used for localized areas of an otherwise flat field such as the pitcher's mound of a baseball stadium.

To initiate a mesh calculation, the calibration engineer preferably selects a plurality of calibration points using the computer mouse 244 or keyboard 242 and then selects to "apply mesh" from a button 268 or other selection device on the display of the calibration program. This selection initiates the mesh program and the computer mesh is created by software which the master broadcaster 215 uses to calculate camera pan and tilt values (from the transform) when the master pan head 220 is moved during filming. Using a field-wide mesh is preferred because of the higher resolution calibration settings, but may be used only locally if the computing power is not sufficient to perform such detailed calculations continuously during taping.

There may also be an "initialize camera" button 270 to reboot the camera in case of a failure or other problem. When the system is first turned on, each of the cameras goes through a boot sequence to prepare it for use. If one camera functions improperly during taping, it may be remotely rebooted from the calibration station using this feature. This may reduce the necessity of having an engineer go out to the camera to initiate a reboot.

Once this first selected camera has been calibrated geometrically, by the mesh method or by a combination of both methods, the camera can be released (e.g., by selecting the "release camera" button 272) which puts the camera back "on-line" as a slave camera in the system. Assuming the master pan head 220 is pointing at a different spot in the stadium than the camera that is being calibrated is pointing, this released camera will reposition itself to that spot and continue normal operation.

A second camera is then selected by the drop-down menu 256, keyboard 242 or some other device, and this second camera is taken off-line and calibrated in the same way as the first camera. Preferably, the same 54 calibration points are selected and entered into a data file, and a geometric and/or mesh calibration map is created. The only difference will be that a different data file (now for camera 2) will be created. All other aspects are preferably the same as those described above.

Each of the cameras needs to be initially calibrated upon installation at a specific location. Additionally, throughout the program, the camera calibration must be updated as the robotic pan heads 152 lose their calibration ("drift") and other environmental aspects affect camera positioning. Because cameras can be taken "off-line" one at a time, re-calibrated, and then released to the system, the re-calibration may continue throughout filming. It has been found experimentally that limiting the number of cameras per calibration computer 240 to no more than five is preferred. Additional calibration computers can be used for additional cameras.

Either during the initial calibration of each camera or at any other time, the calibration engineer may also setup and calibrate a zoom table and focus table for each camera. As seen in FIG. 14, the zoom and focus tables preferably reside in the same data file as the pan and tilt values stored in the data file for calibration. In additional embodiments, the zoom and focus tables may reside in separate data files.

A conventional video camera has a zoom control that can be taken from some minimum value to some maximum value. For robotic control or sensing of the zoom position in the camera, the various amounts of zoom are associated with a data number, such as a number between 0 and 255. Therefore, the minimum zoom may be at zoom=0 and the maximum zoom may be at zoom=255. Because the size of the target object should always be consistent in all of the cameras (which will all be at different actual lengths from the target object), the system preferably keeps track of the appropriate zoom by utilizing the zoom table.

When the camera operator utilizes the master pan head 220 to point the selected master camera at a target object, the camera operator can also zoom in or out on the object utilizing the zoom controller described above. If the captured image is viewed on a television monitor, the target object will be of a certain size, depending upon the amount of zoom selected. Using the multi-camera system 1 of the present invention, the ability to rotate from one camera to the next is desired. However, in addition to having all of the plurality of cameras 150 pointing at the same object, each of the cameras 150 must also have an appropriate amount of zoom so that the target object appears at a near equivalent size. Without this constraint, the target object would appear to reduce and enlarge in size as the image is rotated throughout the various cameras 150. However, because each of the cameras 150 is at a different actual distance from the target image (because the cameras 150 are mounted at different places around the outside of the stadium), the zoom table is used to adjust for the appropriate zoom length for each of the cameras.

The zoom table is created by associating a specific zoom value (e.g., 0 to 255) with the field of view (camera image width) shown in the camera 150 for that particular zoom value. The zoom value can be read from the robotic pan heads 152 (or sent to the pan heads) as an 8 bit word over the fiber optic Ethernet. To "calibrate" a zoom point, the camera is pointed as level as possible and a specific zoom value is selected. The camera is then panned left and right and the encoders are read off of the pan head 152 to determine the width of the field of view. The tilt can then be used to determine the height of the field of view in the same way, if desired.

FIG. 14 shows a field of view value associated with each of the 255 camera zoom values, but not every point needs to be actually measured. Instead, a limited number of sample zoom value/field of view measurements can be taken, and a software program can be used to interpolate the values of the other zoom values by plotting the known (experimentally found) values and plotting them on a curve against the zoom settings. In this way, a table such as the zoom table shown in FIG. 14 can be set up for each of the plurality of cameras 150.

In actual use, the zoom table is used to adjust the field of view of each of the cameras 150 in the system 1. If the camera operator uses the master pan head 220 to point at a target image with a specific zoom, these positional coordinate values and zoom value will be sent to the master broadcaster computer 215 (as well as to the master camera so that the robotic pan head can position the camera). The master broadcaster 215 then calculates (described above) the actual distance from the master camera to the target image as well as the field of view value at that distance and the selected zoom value. The master broadcaster can then use the zoom table associated with the other cameras to "reverse calculate" an appropriate zoom value for each of the plurality of slave cameras. As described above, the distance from the first slave camera to the target image can be calculated using the vertical intercept method. The zoom table for that slave camera can then be used to select an appropriate zoom value so that the field of view for the slave camera matches the field of view for the selected master camera. If these zoom values match, the target image will be of approximately similar size when images from the two cameras are viewed in succession. This same zoom calculation is preferably implemented for each of the slave cameras when their location is calculated by the master computer.

There may also be a focal table associated with each of the cameras. As shown in FIG. 14, the "range vs. focus table" works in a way similar to the zoom table. For ease of use with conventional video cameras, it may be preferred to create this table as an inverse of the range versus the focus parameter of each camera. To set up the focus table, an object is brought into focus at various distances (ranges) from the camera and the inverse range and focus parameters are charted in the focal table. As more points are gathered, the resolution of the focal table will increase. This focal data table may exist as part of the camera data table (as in FIG. 14), or it may exist as a separate data table.

As the camera operator utilizes the master pan head 220 to move the selected master camera to follow a target object, the master broadcast computer 215 uses the transform function to calculate the pan and tilt settings for the plurality of slave computers. As described above, the actual distance from the target object to each of the plurality of slave cameras can be calculated with software. Once this actual value is calculated, the focal table can be used to look-up an appropriate value for the focal parameter for each of the video cameras.

Although not shown in FIG. 8, the multi-camera video system of the present invention may also include one or more paint stations that allow a paint station operator to manipulate certain other features of the plurality of video cameras, such as the iris level, shutter, and/or color settings. Each paint station is preferably connected to the master broadcaster computer 215 such that the images captured from each of the cameras 150 can be selectively viewed on the paint station computer, and the paint station computer can send paint, iris and other commands to each of the cameras 150. The paint station preferably includes a paint computer with monitor, a keyboard and a mouse or other input device.

Figure 15:
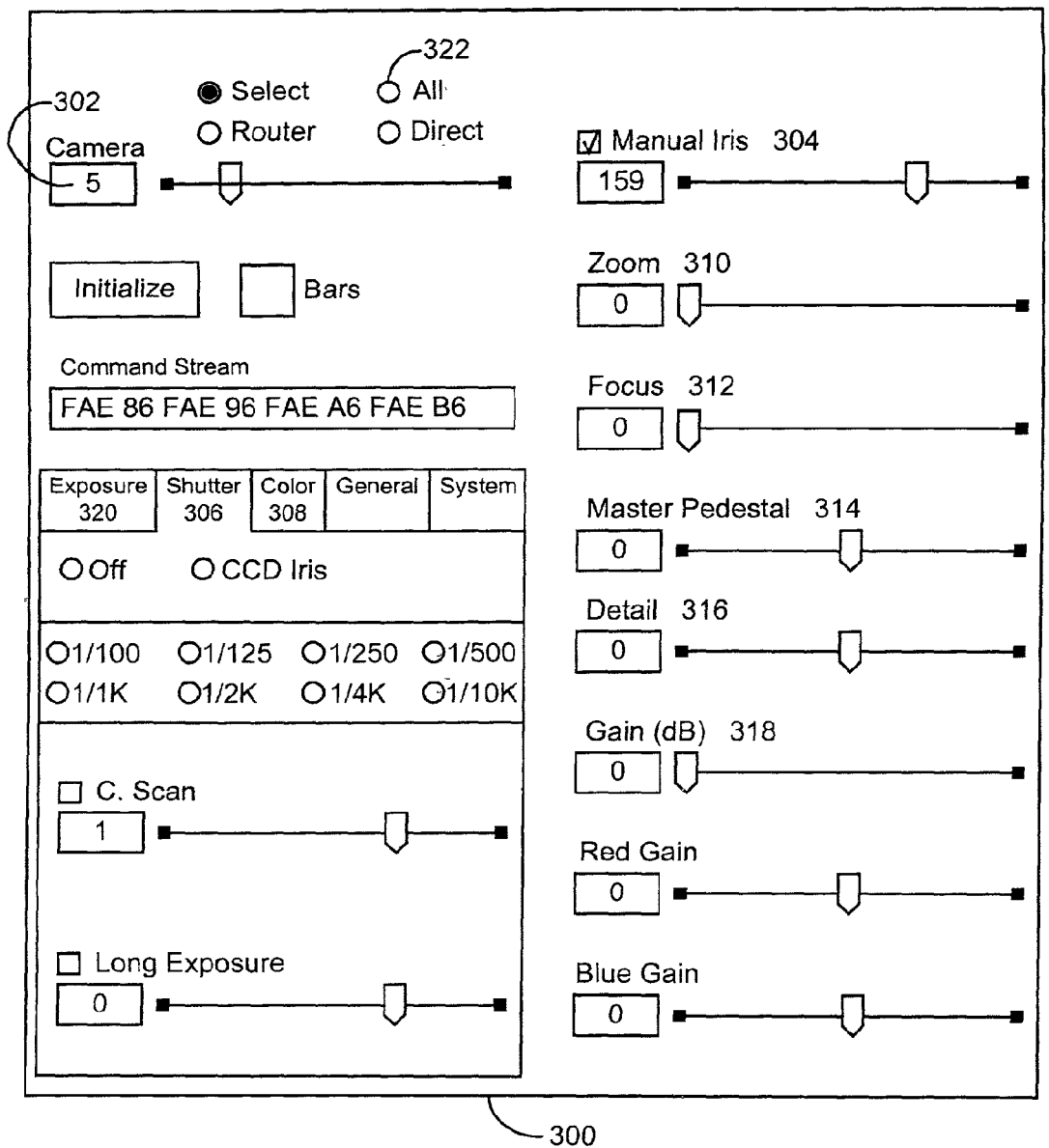
FIG. 15 shows an exemplary screen capture from a paint station computer program display.

FIG. 15 details one exemplary embodiment of a paint station computer program display 300 for implementing the functionality of the paint station. The paint station program preferably includes the ability to select one or all of the plurality of cameras, the ability to control the iris, shutter, exposure, or color of each of the cameras, as well as other functionality in the cameras.

To select a camera for adjusting, the paint station operator may type the camera number into a dialog box 302 or press a hotkey on the keyboard. Once selected, the camera can be controlled by the paint station program. Unlike with the calibration program, the paint station program preferably does not necessitate the movement of the camera, so the camera does not need to be taken off-line to adjust it. Instead, the camera can be adjusted "on the fly" while still recording images and being controlled (for positional purposes) by the multi-camera video system computers.

Once the camera is selected, the paint station operator can manipulate the camera. For example, moving the slider or entering a parameter value in the "manual iris" section 304, the operator can remotely open or close the iris on a camera to let in more or less light. This may be useful when a part of the stadium loses some of its light for some reason. If only one camera seems to be too dark, the paint station operator can flip back and forth between the two cameras and adjust the iris on the darker camera until the two cameras have a near equivalent brightness. This ease of selecting different cameras may be preferred.

In much the same way, the shutter value 306 can be changed. For example, if a slow motion replay is anticipated, the shutter speed can be increased to get a better resolution of images at a slower playback speed. The color section 308 preferably allows the paint station operator to manually adjust the red, green, and blue color settings of each camera. This section 308 could be adjusted to work with any other type of color input used by various video or non-video cameras. Again, the images from two different cameras could be rotated back and forth between each other until the proper color adjustments are made.

There may also be additional controls such as zoom 310, focus 312, master pedestal 314, detail 316, gain 318, exposure 320 and others that can be updated form the paint station. These various feature adjustments preferably work in a manner similar to those described above. Also, these adjustments are sent to the cameras 150 in real-time, through the master broadcaster 215 and the fiber optic network. Because the cameras 150 may still be "on-line," it is preferred to adjust those cameras that are not currently outputting an image signal directly to air (broadcast) or the image may appear strange as it is changed.

In addition to the "single camera" changes just described, there may also be the ability for the paint station operator to update an attribute of each of the plurality of cameras at the same time. For example, if a large cloud flies over a tennis stadium during the filming of a match, the amount of light picked up by every camera will be reduced. Rather than adjusting each of the cameras separately (which may take an extended period of time), the paint station operator can utilize the "all" selection button 322 to adjust every camera at once. The paint station operator can then open the iris of whatever camera he or she is currently viewing by moving the slider bar for manual iris 304. The paint station computer can then calculate the percentage of change that was made to the iris (e.g., opened by 10%) and then make the same change to the iris values of all of the other cameras. Although an absolute amount of change could be made to all of the cameras, the percentage change is preferred because the different cameras will have different iris settings when viewing the same object because the cameras exist at different location with varying amounts of ambient light.

This "all" camera adjustment 322 may also be used for those featured described above such as shutter 306, color 308, exposure 320, zoom 310 and focus 312. There may also be a selection mechanism whereby a selected subset of cameras could be manipulated in unison. This may be useful as the sun sets below the edge of the stadium, whereby only those cameras on one side of the stadium need to be adjusted as the other cameras are still in the light.

Because of the time needed to adjust these features, it is preferable to have no more than five cameras assigned to any one paint station computer. If more than five cameras are utilized in the system 1, there is preferably an additional paint station. Also, as the temperature in the stadium and other environmental conditions change throughout the game, the paint station-controlled parameters should be updated throughout the filming process. The ability to adjust these parameters while the system is running aids in this process.

The above description details how to position and remotely control various features of a plurality cameras 150 mounted around a target image. Because the zoom, focus and other features are controlled, various image storage and replay systems may be used to create effects that can be broadcast over conventional television or other mediums. Some exemplary embodiments of these storage and replay systems, which were introduced above, will now be described.

The fiber optic video converters 172 at the truck side of the system (shown in FIGS. 8 and 11) preferably include analog outputs. As described above, this analog output may be sent to various components of the robotic control system 5 (e.g., cam-A 228, calibration computers 240) to provide visual feedback of the "aim" of each camera 150. As described below, these outputs are also sent to a plurality of digital disc recorders (DDRs) or other storage devices to be archived and used to "produce" multiple camera video feeds to be broadcast over the air. This storage scheme will now be described.

Figure 16:
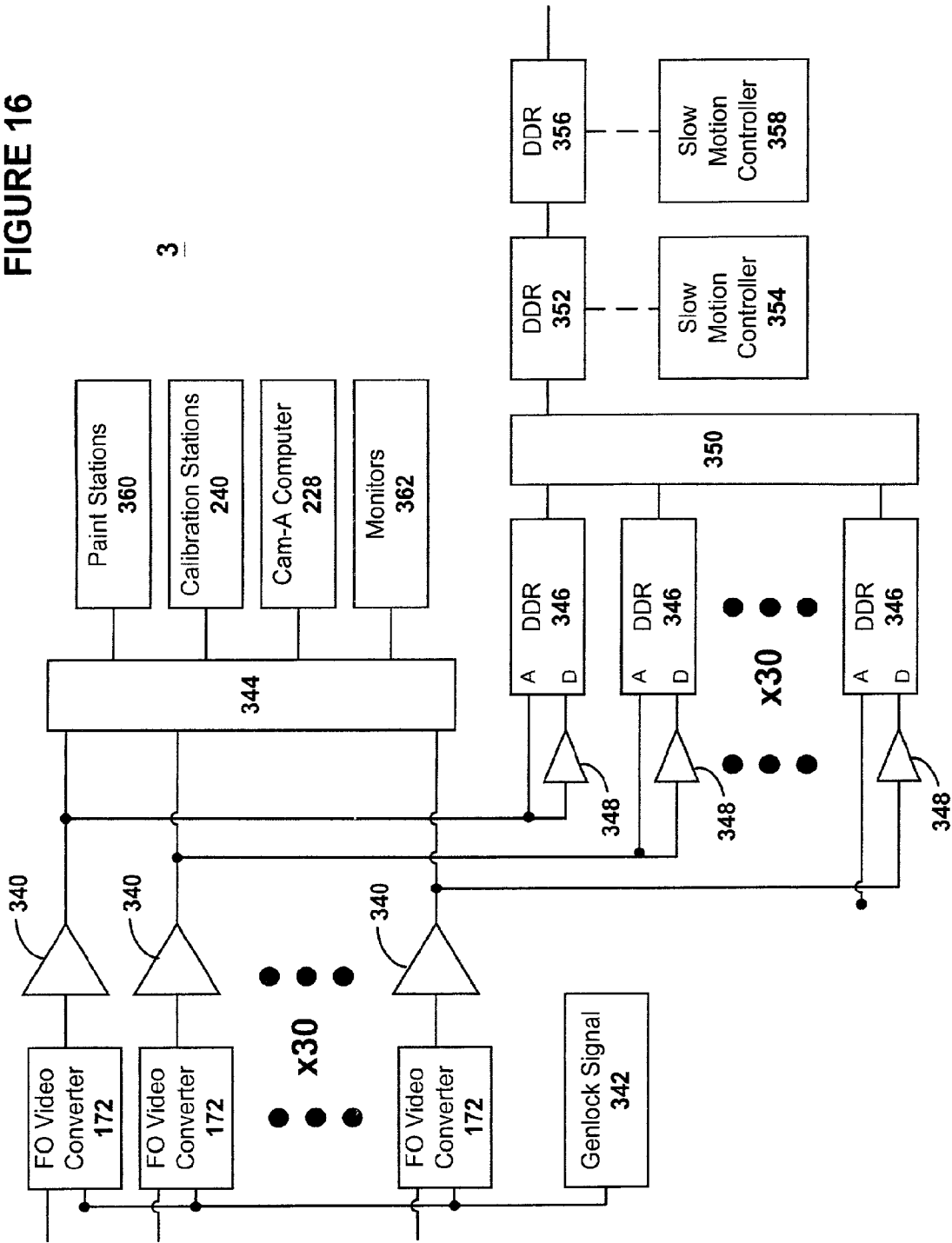
FIG. 16 shows an exemplary DDR-based image storage and playback system.

FIG. 16 generally shows a DDR-based image storage and playback system 3 to be used in the multiple camera video system 1 of the present invention. FIG. 16 includes the plurality of fiber optic video converters 172 (from FIGS. 8 and 11) connected to the video feed of each of the plurality of cameras 150. In this embodiment, the video converters 172 are connected to a single strand of glass fiber 188 (see, FIG. 8). The genlock signal 342 that was previously described as being sent to each of the cameras 150 is also fed into each of the fiber optic video converters 172 to make sure that each field of each frame of stored video from each camera are synchronized in each of the DDRs. This genlock signal 342 "slaves" all of the DDRs 346 together by virtue of the time code. In the present example, there are 30 fiber optic converters 172 shown.

More specifically, the genlock signal 342 is used to make sure all of the cameras 150 and DDRs 346 work together to capture and store images from each of the plurality of cameras 150 at the exact same instant in time. The genlock signal 342 uses a time code that breaks down each television frame into its constituent fields so that each camera 150 and DDR 346 is exactly synchronized. A traditional frame synchronizer, on the other hand, only synchronizes by frame, not by constituent field. Therefore, using such a frame synchronizer only assures that each camera and DDR are in the same television frame, not the same field within each frame. Allowing the cameras 150 to record in different fields may cause the resulting image to "flutter" when the image is rotated from one camera to the next. Each TV frame typically includes 4 fields, and not synchronizing by field can cause a noticeable flutter, especially when the slow-motion controller is used to spin through multiple camera video feeds.

There is also a plurality (in this case 30) of analog distribution amplifiers 340 connected to the output of each of the fiber optic video converters 172. These amplifiers 340 take the analog output of the video feed from the fiber optic video converter 172 and strengthen the signal while providing additional analog outputs for further distribution. The outputs of these amplifiers can then be fed to the DDRs 346 or other storage devices, the cam-A computer 228, the paint stations 360, the calibration computers 240, any monitoring stations 362, and/or other elements of the system.

One storage element for use with the present multi-camera video system is a digital disc recorder 346, such as the DoReMi DDR with 2:1, 4:1, or 8:1 compression. The DDR 346 typically includes both analog and digital inputs as well as an analog to digital converter built into the analog input so that analog input data can be stored in a digital format.

The output of each of the analog distribution amplifiers 340 may be brought either directly or indirectly into the DDRs 346. Because the video feed is analog at this time, it can be connected directly to the analog input of the DDR 346 and the internal analog-to-digital converter (typically an 8 bit converter) can be used to digitize the information so that it can be digitally stored in the DDR 346. Alternatively, each of the 30 (or any number) analog signals from the distribution amplifiers 340 could be run through an analog-to-digital converter 348, such as the 10 bit converter shown in FIG. 16. The output of each of these analog-to-digital converters 348 can then be brought into the digital input of each of the DDRs 346. These 10-bit analog-to-digital converters may provide a higher resolution digital signal to the DDR 346, but it also adds an additional cost to the system when compared to using the analog input on the DDRs 346. Also, the higher resolution signal will use up more DDR storage space per unit of recording time than a lower quality version of the same information. Therefore, there is a tradeoff between image quality and the amount of time for which the signal can be recorded.

Additionally, the DDRs 346 may include an internal compression algorithm that allows compression of the digital data. For example, the DDRs 346 shown in FIG. 16 include a 2:1, 4:1 and 8:1 compression. Again, the tradeoff is between recording a longer amount of time and the quality of the recorded image. For a broadcast signal, the compression should preferably not exceed 2:1.

The output of each of the plurality of DDRs 346 is then preferably connected to the input of a digital router 350 that is controlled by a slow motion controller 354. The digital router includes enough inputs so that a digital feed from each of the DDRs 346 (e.g., 30) may be connected thereto, and at least one output which is preferably connected to an additional DDR 352 or other storage device. The slow motion controller 354 is preferably a modified tape controller that acts as a router controller for controlling which of the DDR feeds is passed out of the router 350 for storage in the additional DDR 352. The output of the additional DDR 352 is then available to be sent to air or stored for further production. Although it appears that the controller 354 is only controlling this additional DDR 352, it is actually controlling each of the plurality of video storage DDR 346 outputs simultaneously. The genlock signal 342, described above, allows each of the DDRs 346 to be completely synchronized.

The slow motion controller 354 preferably includes the ability to move forward and backwards through the recorded video content of the DDRs 346 and to "rotate" through the different cameras 159. If the action is frozen in a video picture frame and the router output 350 is rotated from one camera to the next camera and then to the next camera, the images output from the digital router 350 will appear to rotate around the target object (as generally described above). These motion and camera selectors may be slider bars, joysticks, knobs or other selectors. They may exist in one controller, or there may be a separate camera selection controller (with rotating knob) connected to the slow motion controller 354 for moving forward and backwards through the video feed.

This additional DDR 352 output may be sent directly to a broadcast truck or other entity to be broadcast to a live television audience or it may be recorded to yet another DDR 356, tape, or other storage device. If an additional storage device 356 is used, a second tape controller (slow motion controller) 358 can be used to further edit or produce the stored segment of video. For example, the first slow-motion controller may select the view of a quarterback as he drops back and hands off to a running back and then rotate around the running back as the ball carrier fumbles the football. The segment may continue from a second camera's point of view as the teams scramble for the loose ball, and a third camera may be used to show the defensive back pick up the fumble and run in for the touchdown. While one network may choose to show this pre-produced video segment (saved on the first DDR 352) to their audience (for example, on the nightly news), the network that is currently broadcasting the game may choose to record the segment to an additional DDR 356 and then further analyze the play. By using a second slow-motion controller 358, the point of fumble can be rewound and replayed multiple times, at varying speeds. The output of this additional DDR 356 could then be fed to a broadcast truck or additional storage. This second slow-motion controller 358 provides additional production flexibility.

Looking at FIG. 16, the output of the analog distribution amplifiers 340 preferably also go to an analog router 344 that distributes the analog video feeds to a plurality of elements on the robotic side 5 of the system 1. For example, the analog router 344 preferably includes a plurality of outputs, as shown in FIG. 16. Each of the analog outputs may be controlled from a different source by a rotatingly selectable switch, such as a BUF controller. By rotating the switch at the remote location, the different camera video feeds may be selected. As shown in FIG. 16, the analog outputs of the router 344 may be fed to the monitor on the master pan head from cam-A 228, each of the calibration stations 240, each of the paint stations 360, any monitoring station 362, and/or any other element that utilizes selectable control of the video feeds. This demonstrates the intermixing of the components between the camera control system 5 and the image storage and playback system 3.

In another embodiment of the present invention, the multiple digital disc recorders 346 could be replaced by a file server or some other mass storage apparatus. As described above, the DDRs 346 have a single output, and therefore can only be used by a single user at a time. The advantage of a file server or other mass storage device is that multiple entities can be streamed the content simultaneously, thereby allowing for multiple feeds of the same content. For example, multiple networks could receive a feed for an interesting play at a football game and each generate their own broadcast effects based on the recorded information. Additionally, the information on the file server can be easily copied to multiple output sources thereby aiding in the archiving and distribution of the feed.

For certain effects that may be difficult to produce directly from a file server, for example a reverse motion play), the file server contents could be recorded to a tape. This tape could then be used like the DDRs or other conventional devices to create reverse motion or other effects.

In an extension of this concept, the images (server contents) could be streamed to an end user over the Internet through a device such as an Internet-enabled video game machine, a home computer, or other Internet device. The home user could then control the "editing" of the instant replay or other image according to their own desires.

The multiple camera system of the present invention may also include a plurality of microphones to record sound as it travels throughout the field. For example, FIG. 17 shows a schematic view of a football field 400 with a plurality of spaced microphones 402. Typically, the microphones used at a televised sporting event are omni-directional to pick up a maximum amount of sound. In a preferred embodiment of the present invention, these microphones are directional microphones 402 that pick up sound from a smaller sound field than traditional microphones.

The microphones 402 may be stationary and pick up sound only at one part of the field, or the microphones 402 may also be mounted to the robotic pan heads 152 or other device that allows the microphones 402 to "follow" the target object and pick up sound near that object.

Because sound travels much slower than light, the microphones 402 that are farther away from the target object will receive sound emanating from that object later than microphones 402 that are closer to the action. Although this phenomenon also exists in relation to the images captured by the cameras 150, the result is negligible in the camera case because of the extremely high velocity of light. However, with the microphones 402, some correction is preferred.

To correct for the propagation of sound waves, the outputs from each of the plurality of microphones 402 are preferably fed into a digital mixer 404 capable of delaying the sound on a per-channel basis. As described above, the multi-camera system 1 already computes the position of the target object on the field in order to remotely control the master and slave cameras 150. This positioning calculation can also be used to calculate the distance from each directional microphone 402 to the target object. The digital mixer 404 then can delay the input from each microphone 402 an amount of time that compensates for the propagation of sound. To be even more accurate, the system preferably calculates the appropriate speed of sound based on the current relative humidity at the stadium. During a sporting contest or other event, this relative humidity will change and therefore should be compensated for. Additionally, the altitude of the event should be taken into account. By delaying the "quicker" microphones, the sound from each of the microphones 402 will be in phase and the sound will be added from all of the microphones. This calculation may be carried out on a microphone computer 406 connected to the digital mixer.

Figure 18:
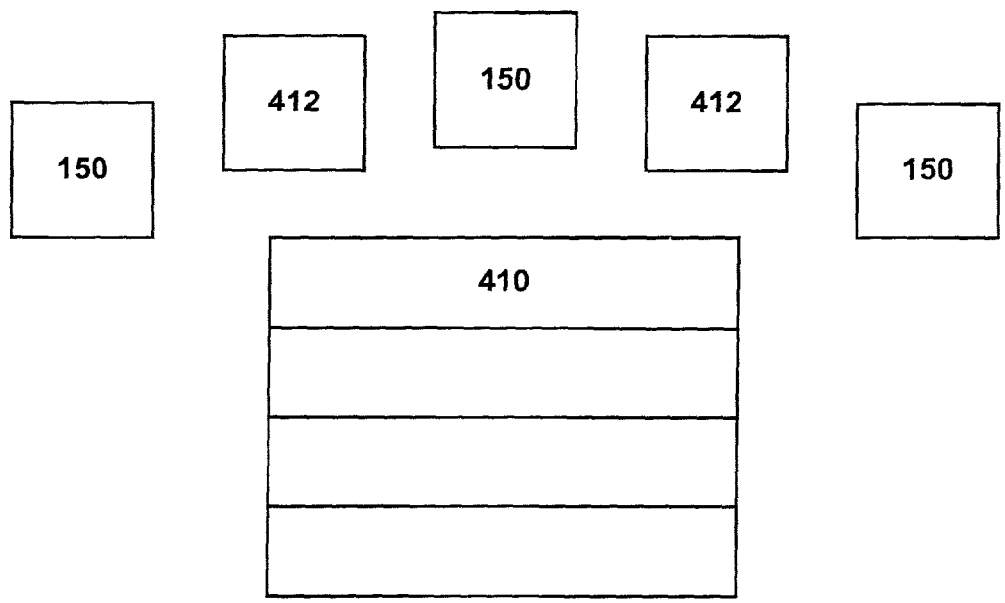
FIG. 18 shows an exemplary use of "virtual cameras" between actual cameras at a football game.

The multiple camera video system 1 of the present invention could also be enhanced with the use of "virtual" cameras inserted between the plurality of actual cameras 150. If less than a desired number of camera positions are available, or if a greater resolution of image rotation is desired, additional "virtual" cameras could be implemented using a software program to interpolate camera images in between two existing cameras. For example, FIG. 18 shows one corner of a football stadium 410 with three cameras 150 mounted on robotic pan heads 152 according to the present invention. FIG. 18 also shows the location of a virtual camera 912 that is mounted between each two "real" cameras 150. This virtual camera 412 does not physically exist, but the image from such a camera 412 could be fabricated with software.

For example, as images are captured by the two real cameras 150 and sent to the broadcast side of the system (e.g., the master broadcaster 215), a computer may use software to compare the pixels of each frame from one camera with the corresponding pixels in the adjacent camera. To create a "virtual" camera 412 between these two real cameras 150, the software preferably interpolates the color of each pixel to be a transition color between the colors of the two actual pixels. If the two cameras 150 have pixels of the same color, the virtual image will have that same color. If the two cameras 150 have different colors, these colors are analyzed and a transition color is used. This transition color may be determined based on the values for red, green, and blue in the color spectrum, or by some other means.

The resulting virtual image does not necessarily represent any real-world image that could be taken. Instead, the virtual image provides a smoother transition between images when the image is rotated from the first real camera to the second real camera. Therefore, when spinning through the cameras 150, 412, the resolution is increased.

Although this feature has been described with the production of a singe virtual image 412 between two adjacent real cameras 150, there could also be two or more virtual images 412 interpolated in this gap. The color transition may be scaled to utilize any number of virtual images, and the present invention is not limited to any particular number of virtual images.

It should be noted that the master camera positioning device has been described above as being a conventional manual pan head that provides tactile feedback to a camera operator while he or she remotely controls a master camera. In actuality, any device that generates location information that can be translated or transformed into camera and robotic pan head settings (i.e., pan, tilt, etc.) may be used. For example, a joy stick or any other input device may be manipulated to move the master camera.

In one embodiment of the present invention, there is not even a need to directly control the master camera through manual means. For example, an RF tracking system could be used. In this system, each of the players, the ball, or any other object could include a small RF transmitter or transceiver that outputs positional coordinates as the player or ball moves around the field. These positional coordinates may then be received by a receiver connected to the master broadcaster computer. This master broadcaster computer can translate the positioning coordinates into actual pan and tilt settings for each of the master and slave robotic pan heads. The positional coordinates of each player (from each transmitter) may be sent over a different carrier frequency, so that one specific target transmitter could be chosen. For example, the camera operator may select the target transmitter by using preset function keys tied to each transmitter in the same way that preset function keys were used above to select different areas of the field (pitchers mound, etc.). This RF scheme requires even less manual control than other some other embodiments described above.

With this invention, a director of a televised sporting event can produce replays of the events that permit an in-depth analysis of the action by combining information contained in video images taken from different spatial perspectives. The invention also provides the ability to change video framing during recording of an event.

In addition to the use of the present invention in broadcasts of football games as shown in the preferred embodiment, this invention has many other practical applications such as, golf swing analysis and telecasts of basketball, gymnastics, track and field, boxing and entertainment events. The invention could also used in the movie industry.

For example, rather than filming a movie scene numerous times from various different angles, a multiple camera system could be used to follow a target object in the movie scene using a remote master pan head and other system components. Such a system may save studio time in the production of movies and may further enable a smoother transition from one camera angle to the next.

Additionally, by using high definition video cameras in place of traditional film cameras to record a scene from a multiple of perspectives, a more complete record of the scene can be obtained, providing for more options in editing of the video for incorporation into a final video sequence. For example, a 16:9 aspect ratio high definition camera with a wide angle lens could be used to capture the target image from a plurality of locations. Then, each of the wide angle images could be broken up into two, three or more images that reside next to each other in real space. This utility can be accomplished by segmenting the video frame into different sectors. A "spinning" output could then be produced using a reduced number of cameras than described above.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A method associated with a moving target within a dynamic scene, comprising:
    reading parameters of a first variable pointing camera system;
    determining parameters for a plurality of other variable pointing camera systems based on the parameters of the first variable pointing camera system and mapping data for the camera systems, wherein the first variable pointing camera system and the plurality of other variable pointing camera systems are positioned around the scene, such that, at a point in time, each of the variable pointing camera systems is aimed at the target and a size of the target in an image from each of the variable pointing camera systems is substantially the same; and
    controlling the plurality of other variable pointing camera systems based on the parameters for the plurality of other variable pointing camera systems wherein the mapping data includes initial calibration data established when the plurality of slave variable pointing camera systems are installed at the dynamic scene, comprising
        initial calibration data regarding the geometric relationship of the camera systems to the scene;
        initial calibration data regarding the relationship between the zoom and the angular field of view for each camera system; and initial calibration data regarding the relationship between the focus and the range to target for each camera system, and further wherein a first slave variable pointing camera system is taken off line during filming of the dynamic scene, re-calibrated to adjust the initial calibration data, and returned on line during filming.

2. The method of claim 1, wherein: reading parameters of the first variable pointing camera system includes reading mechanical and optical parameters of the first variable pointing camera system; and determining parameters for the plurality of other variable pointing camera systems includes determining mechanical and optical parameters for the plurality of other variable pointing camera systems.

3. The method of claim 2, wherein the first variable pointing camera system includes a first pan/tilt camera system, wherein the plurality of other variable pointing camera systems include a plurality of other pan/tilt camera systems, and wherein: reading parameters of the first pan/tilt camera system includes reading pan, tilt, zoom and focus parameters of the first pan/tilt camera system; and determining parameters for the plurality of other pan/tilt camera systems includes determining pan, tilt, zoom and focus parameters for the plurality of other pan/tilt camera systems.

4. The method of claim 1, further comprising: storing digitized, time-stamped images from the variable pointing camera systems; and generating a video image sequence of the target by outputting an image from certain of the variable pointing camera systems in sequence according to the position of the variable pointing camera systems around the scene.

5. The method of claim 1, wherein determining parameters for the plurality of other variable pointing camera systems includes: determining a position of the target within the scene and a size of the target at the position in an image from the first variable pointing camera system based on the parameters of the first variable pointing camera system; and determining the parameters for each of the other variable pointing camera systems based on the position of the target and the size of the target in the image from the first variable pointing camera system.

6. The method of claim 1, further comprising selecting one of the other variable pointing camera systems to be the first variable pointing camera system.

7. The method of claim 4, wherein generating the video image sequence includes generating a 3 D stop-motion video image sequence of the target by outputting images from each of the variable pointing camera systems according to their position around the scene, wherein the images are from a common point in time.

\* \* \* \* \*